June 7, 1966 C. W. E. WALKER 3,255,408
INSTRUMENT FOR MEASURING MOISTURE CONTENT AND THE LIKE
Filed Feb. 25, 1963 4 Sheets-Sheet 1
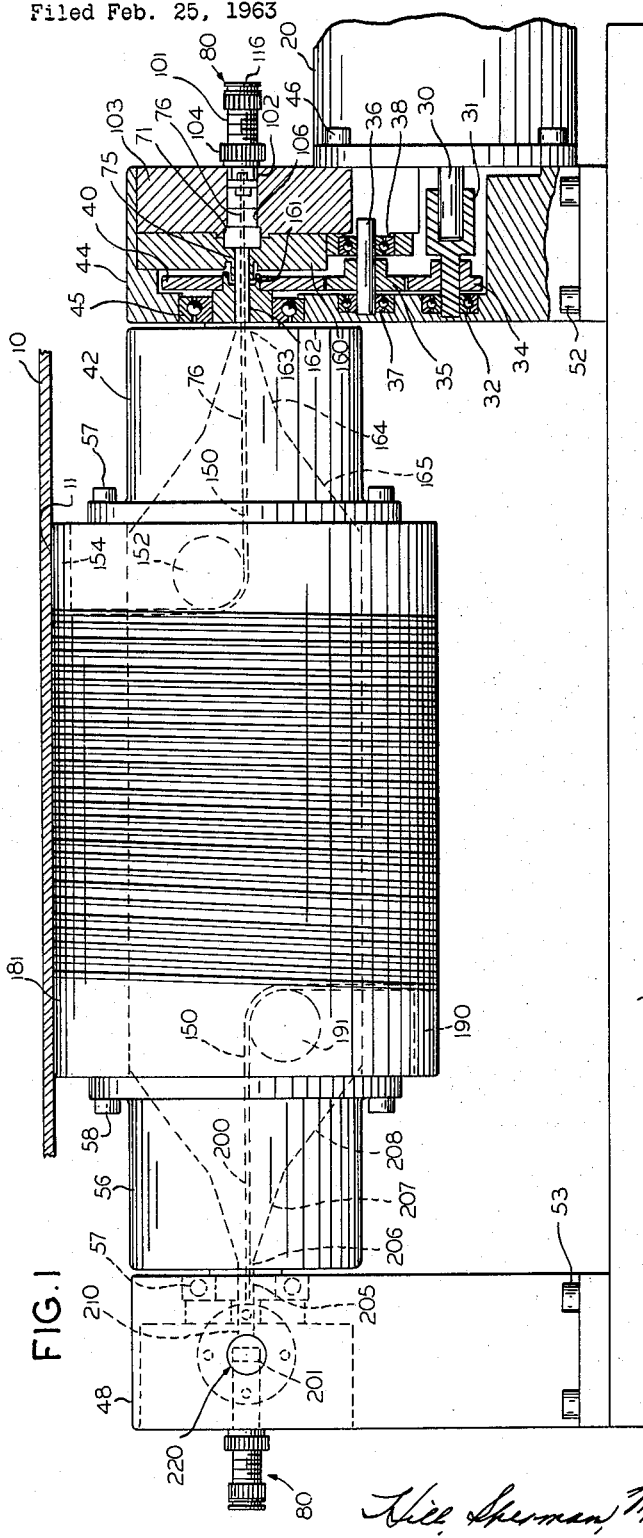
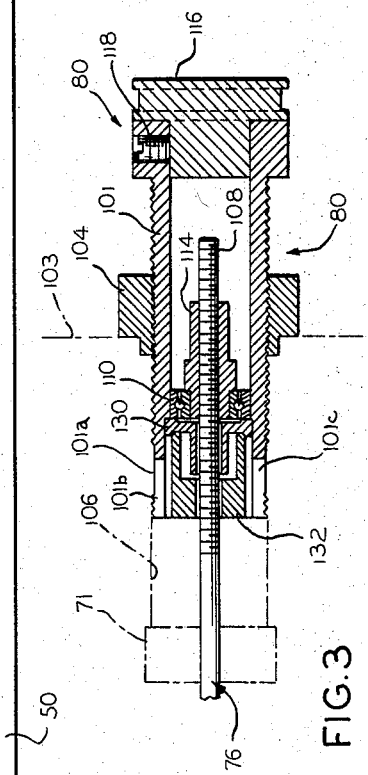
INVENTOR.
CHARLES W. E. WALKER
BY
ATTORNEYS June 7, 1966  C. W. E. WALKER  3,255,408
INSTRUMENT FOR MEASURING MOISTURE CONTENT AND THE LIKE
Filed Feb. 25, 1963  4 Sheets-Sheet 2

INVENTOR.
CHARLES W. E. WALKER
BY
ATTORNEYS

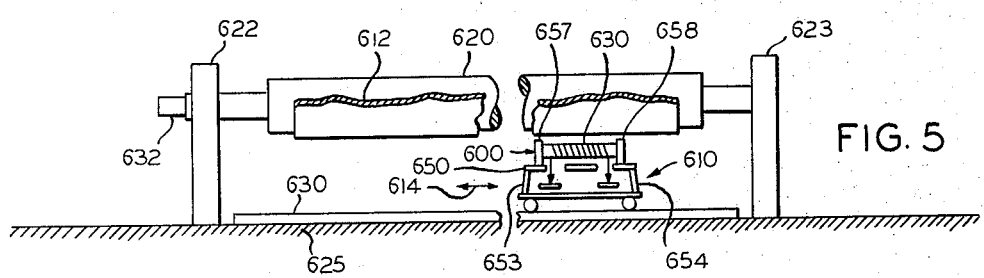
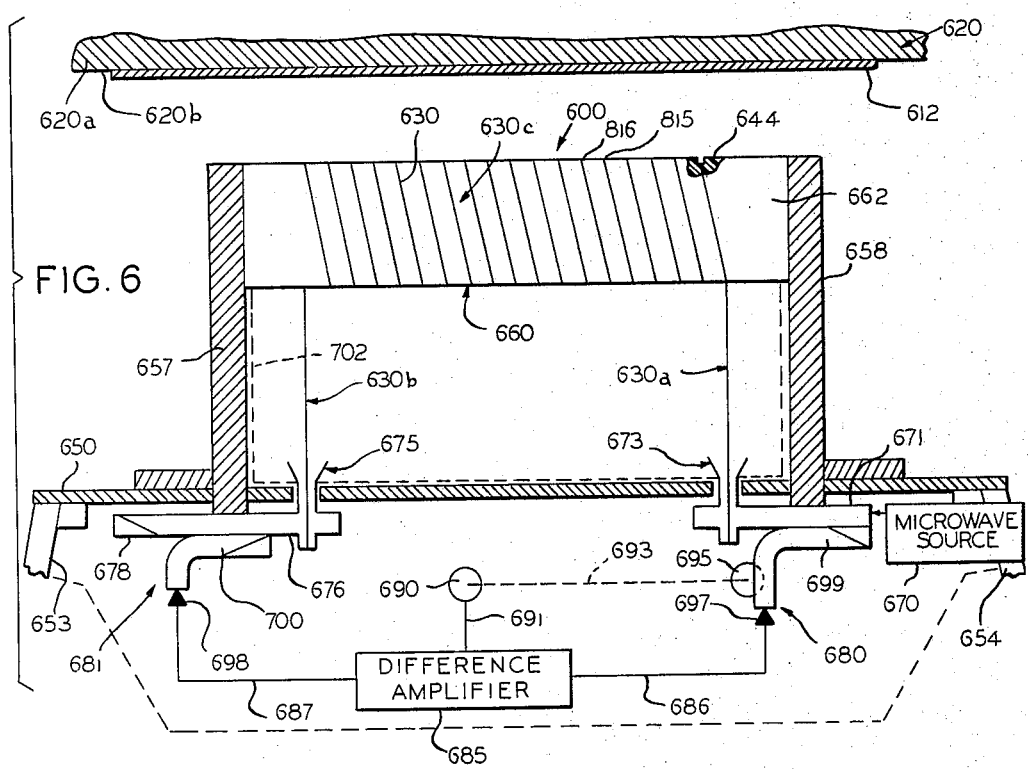
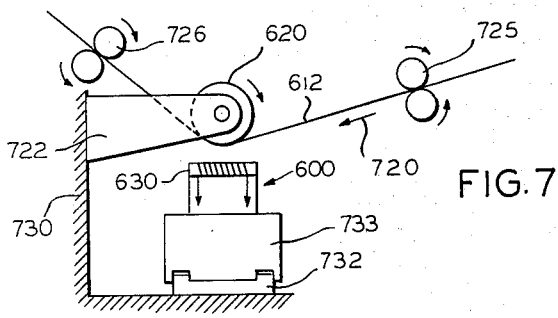

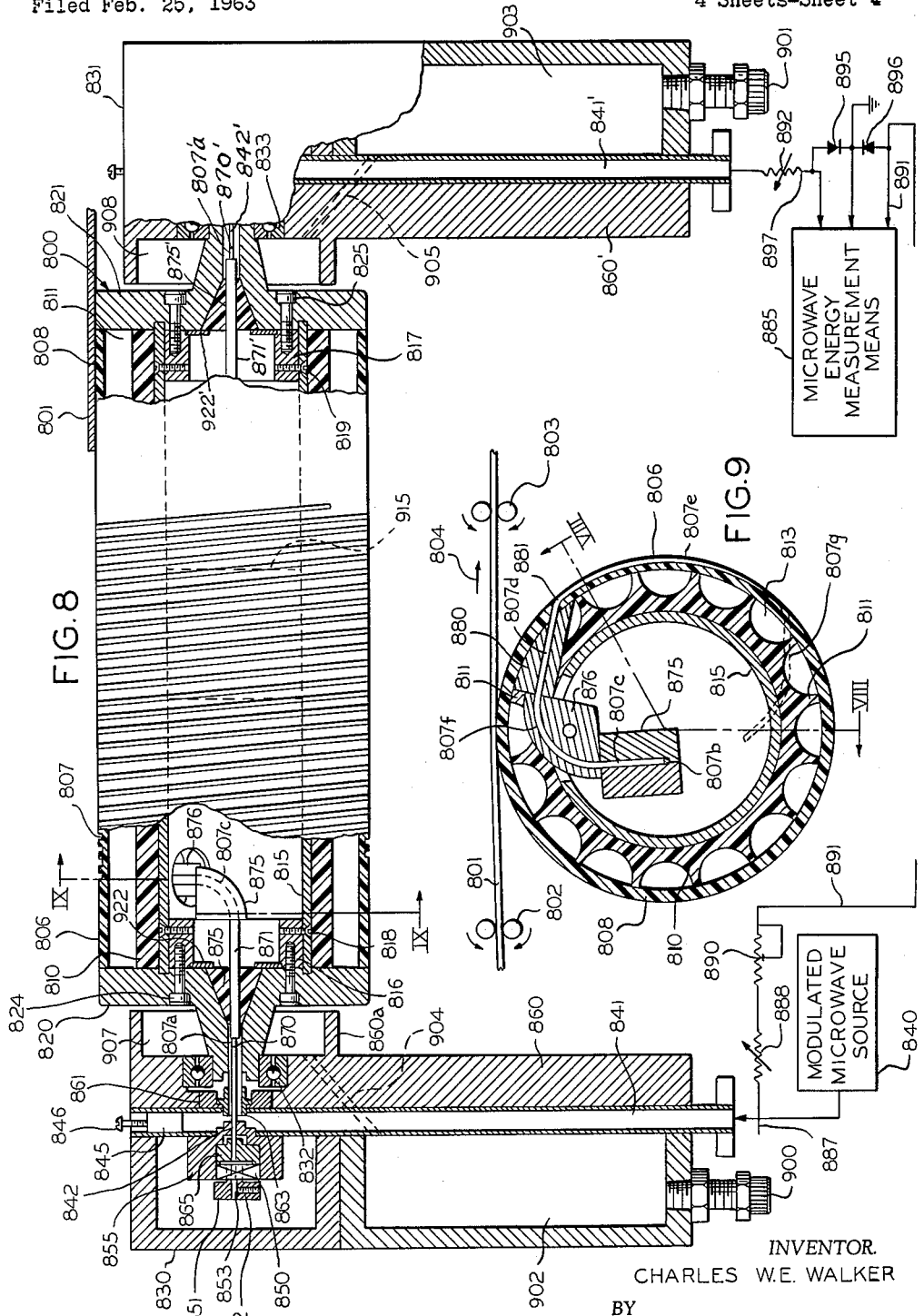

United States Patent Office 3,255,408
Patented June 7, 1966

3,255,408
INSTRUMENT FOR MEASURING MOISTURE
CONTENT AND THE LIKE
Charles W. E. Walker, Beloit, Wis., assignor to Beloit
Corporation, Beloit, Wis., a corporation of Wisconsin
Filed Feb. 25, 1963, Ser. No. 260,743
9 Claims. (Cl. 324—58.5)

The present application is a continuation-in-part of my copending application U.S. Ser. No. 753,987 filed Aug. 8, 1958, and of my copending application Ser. No. 84,657 filed Jan. 24, 1961, now Patent No. 3,079,522 issued Feb. 26, 1963.

This invention relates to a microwave apparatus and method and particularly to a single conductor surface wave device.

Trade names and trademarks appearing in the specification are capitalized and enclosed by quotation marks.

As taught in my copending applications, a surface wave transmission line may be formed into a loop or coil and microwave energy transmitted as a surface wave therealong. The length of the loop or of the multiple loops forming a coil is preferably such that the microwave energy which travels about a loop and returns to a point at or adjacent to the entrance point of the loop will have a predetermined phase relation to microwave energy entering the loop; for example the length of the loop may be a whole number of wavelengths so as to give reinforcement. Such loop devices have a wide range of application and may, for example, be used in microwave measurement of the moisture content of a paper web. Since the length of the loop is a whole number of wavelengths for maximum gain, the structure is highly frequency sensitive. The loop surface wave device can therefore fulfill the same function as a cavity resonator and can be applied in the design of magnetron or klystron-like oscillators.

It is therefore an important object of the present invention to provide a novel and improved method and means for determining the amount of a substance such as moisture associated with a solid or fluid material.

A further object of the invention is to provide a novel and improved apparatus for sensing a constituent of web material.

Still another object of the invention is to provide a surface wave device in the form of a coil for sensing a constituent of moving material which has a reduced frictional effect on the moving material.

A still further object of the invention is to provide a novel and improved coil type sensing head for coupling of microwave energy to a material under test.

Yet another object of the present invention is to provide novel means for guiding microwave energy along a curved surface wave transmission line.

Other objects, features and advantages of the present invention will be apparent from the following detailed description taken in connection with the accompanying drawings, in which:

FIGURE 1 is a somewhat diagrammatic elevational view of a microwave sensing head in accordance with the present invention with certain parts broken away and shown in section;

FIGURE 3 (on sheet No. 1) is an enlarged somewhat diagrammatic sectional view of the coaxial short circuit assembly which is shown in elevation in FIGURE 1 at the right hand (launching) side of the sensing head;

FIGURE 5 is a somewhat diagrammatic elevational view illustrating a sensing system wherein the sensing head may be moved transversely of the direction of web movement to scan successive transverse sections of the moving web;

FIGURE 6 is a somewhat diagrammatic vertical sectional view illustrating the details of a sensing head for the system of FIGURE 5;

FIGURE 7 is an elevational view similar to that of FIGURE 5 with respect to the web transporting mechanism but showing a view of the web transporting mechanism at right angles to that of FIGURE 5;

FIGURE 8 is an elevational view of a preferred embodiment of the invention with certain parts broken away as indicated by section line VIII—VIII in FIGURE 9; and FIGURE 9 is a cross sectional view taken along the line IX—IX of FIGURE 8.

As shown on the drawings:

Figure 2:
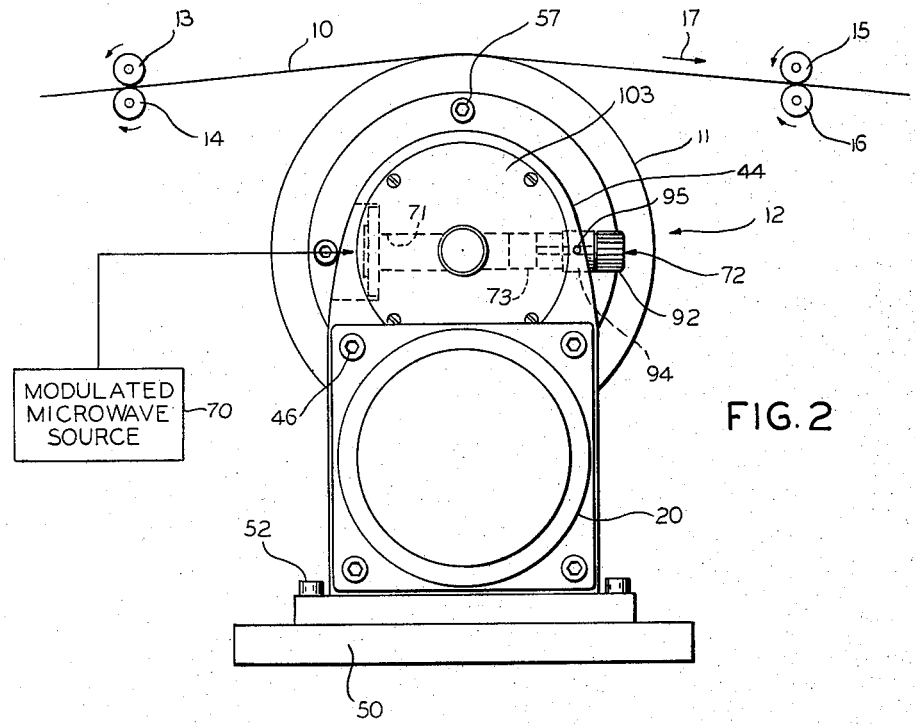
FIGURE 2 (on sheet No. 2) is an end elevational view of the head of FIGURE 1 and showing the manner in which a paper web may travel over the sensing head.

FIGURES 1 through 4 illustrate a system for sensing moisture content of a moving paper web 10, FIGURE 2. In this embodiment, the web 10 may travel in actual contact with a cylindrical external surface 11 of a sensing head 12. The web 10 is illustrated as being moved at constant speed by means of feed rollers 13, 14 and 15, 16 in the direction of arrow 17. The sensing head 12 may be positively driven by means of a motor 20 to rotate in the direction of arrow 21 so that the surface 11 has a linear speed substantially equal to the speed of movement of the web 10.

As illustrated in FIGURE 1, the motor 20 may be provided with an output shaft 30 driving a shaft extension 31 which is mounted on suitable bearing means 32. A gear 34 on shaft extension 31 may drive a second gear 35 on an idler shaft 36 which is journalled in bearings 37 and 38. Gear 35 in turn drives a gear 40 which is carried on a rotating taper section 42. The taper section 42 is journalled in a launch end bearing block 44 by means of a bearing 45. The motor 20 is secured to the bearing block 44 by suitable fastening means such as indicated at 46. The bearing block 44 and a similar receiving end bearing block 48 are secured to a base plate 50 by fastening means such as indicated at 52 and 53. A receiving end taper section 56 is mounted by means of bearings 57 in the receiving end of bearing block 48, and taper sections 42 and 56 are secured to the sensing head 12 by means of fasteners 57 and 58 so as to mount the sensing head 12 for rotation on a central axis.

As illustrated in FIGURE 2, modulated microwave energy may be supplied from a source 70 to a rectangular waveguide section 71 at the launching end bearing block 44. A waveguide shorting assembly 72 including a shorting block 73 is associated with the rectangular passage 71 so as to couple the microwave energy from the rectangular waveguide 71 to the coaxial waveguide generally indicated at 75 in FIGURE 1 and including an inner conductor 76 which extends from a coaxial short circuit assembly 80, FIGURE 1, and connects with a helical conductor 85 of the sensing head 12.

The launch and waveguide short assembly 72 includes a threaded shaft 90 secured to the shorting block 73 and threadedly engaged within a screw sleeve member 91 which is secured to the knob 92. A body member 94 is secured in the bearing block 44 by means of a set screw 95 and rotatably mounts the screw sleeve 91. Thus, rotation of knob 92 rotates screw sleeve 91 to adjust the position of end face 73a in passage 71. A set screw 97 engages the screw sleeve 91 to lock the same in a fixed position after adjustment thereof.

Referring to FIGURE 1, the coaxial short assembly 80 includes an externally threaded body member 101 which engages with an internally threaded section 102 of a waveguide block part 103. A lock nut 104 affixes the coaxial short assembly 80 in the desired position within the coaxial passage indicated at 106. An inner conductor part 108 which extends within the threaded body part 101 is journalled by means of suitable bearings as generally indicated at 110 so that the inner conductor 76 including the portion 108 thereof is rotatable with the sensing head 12. An anchor nut is threadedly engaged on the free end of the inner conductor 108 as indicated at 114. A cover member 116 has a reduced portion telescoping within the body 101 and retained therewith by means of a set screw 118 so that by loosening the set screw 118 the cover 116 may be removed. With the cover 116 removed, access is provided to the anchor nut so that the anchor nut may be adjusted on the inner conductor 108 by means of a special wrench fitting over the free end of the inner conductor 108 and having a non-circular recess receiving a non-circular portion of the anchor nut 114.

Figure 4:
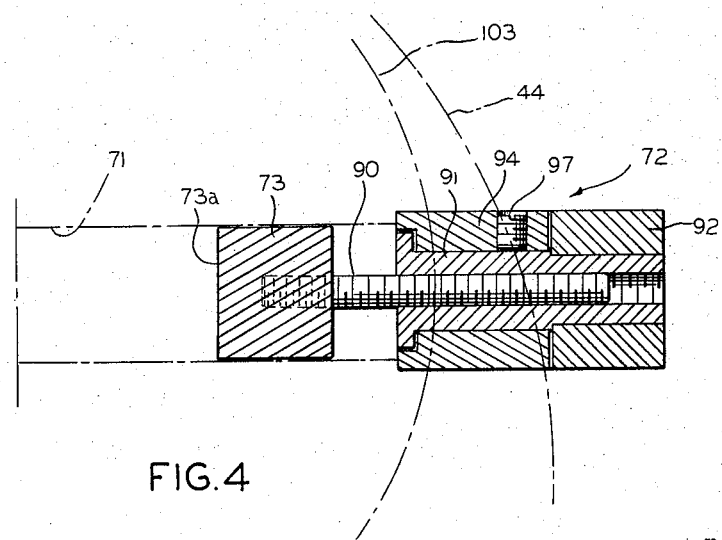
FIGURE 4 (on sheet No. 2) is an enlarged somewhat diagrammatic sectional view of the waveguide shorting assembly which is shown in elevation in FIGURE 2.

Further details of the waveguide short assembly 72 and of the coaxial short assembly 80 will be apparent from FIGURES 3 and 4. As will be seen from FIGURE 3, coaxial short body part 101 has the external threads removed at region 101a. The body 101 has a series of slots such as indicated at 101b and 101c extending inwardly from the free end thereof and located at intervals of 45° about the perimeter thereof. The slots may have a width of 1/32 inch, a depth or axial dimension of 3/16 inch. The body member 101 may be of beryllium copper and may be silver plated.

An inner conductor member 130 may be made of brass and fitted within the open end of the body 101. A face member 132 also of brass may be assembled with the inner conductor member 130 as shown in FIGURE 3 to provide a short circuit termination for the coaxial line including outer conductor 106 and inner conductor 76 so as to efficiently couple microwave energy from the waveguide 71 to the coaxial line 75.

The inner conductor member 108 may be of brass and have a 1/16 inch diamter. The end of this wire may be brazed or otherwise secured to a .062 square brass wire 150 which forms the helical coil 85. The wire 150 may have a .004 inch silver plating thereon, unpolished. The square wire 150 may extend about a first cylinder 152 having a .070 inch by .070 inch channel therein acccomodating a 90° bend in the wire 150. The wire then curves about a second cylinder 154 having its axis parallel to the axis of the sensing head 12 and provided with a square channel accommodating a bend of the wire 150 through 90° into the direction extending circumferentially with respect to the sensing head 12.

The outer conductor of coaxial line 75 is defined progressively by a cenral bore of a waveguide part 160 and by successive portions 161–165 of the rotating taper section 42. The progressively flaring arrangement defined by the interior surfaces 163, 164 and 165 of the taper section 42 are such as to efficiently launch the microwave energy as a surface wave along the inner conductor 76 which extends centrally within the taper section 42. The cylinders 152 and 154 are of dielectric constant and radius so as to effectively prevent radiation of the surface wave from the wire 150 and thus to couple the surface wave energy to the successive turns of the helical coil 85.

The helical coil 85 is mounted in a helical groove 180 of square cross section extending in a tubular member 181 of dielectric material. By way of example, the helical groove 180 may have a cross section of .070 by .070 inch and there may be a center to center spacing between successive grooves of 1/8 inch. The wire 150 may have a cross section of brass .062 inch square with a .004 inch layer of silver plate so as to precisely fit within the cross section of the groove 180 with the upper flat surface of the wire 150 such as indicated at 150a flush with the upper surface 181a of the tubular member 181.

A mass 185 of dielectric absorbing material may be located centrally of the tubular member 181 so as to intercept and absorb any microwave energy radiated from the inner conductor 76. The absorbing mass 185 may be formed by securing conductive faces of two separate sections together at a boundary 185a which thus provides a conductive barrier between the input and outlet sides of the sensing head.

At the receiving side of the sensing head, the conductor 150 extends about an outer dielectric member 190 corresponding to the dielectric member 154 and then extends about a second dielectric member 191 corresponding to the dielectric member 152 at the input side of the sensing head. The square cross section conductor 150 is brazed to an inner conductor member 200 which is coupled to a rectangular waveguide passage 201 by structure corresponding to that at the input side of the sensing head. Thus, the receiving end of bearing block 56 is provided with surface portions such as indicated at 205, 206, 207 and 208 defining a tapering outer conductor for coupling the surface wave energy to a coaxial conductor section such as indicated generally at 210. A coaxial short assembly 80 is provided in the coaxial line 210 for coupling the energy thereof to the rectangular waveguide 201, and the rectangular wave passage 201 is provided with a waveguide short assembly 220 identical to that designated by the reference numeral 72 at the input side of the sensing head.

*First specific example in accordance with the embodiment of FIGURE 1*

In the first example in accordance with FIGURES 1 through 4, the web 10 of paper or the like may have its surface in direct contact with the surfaces 150a of the wire 150. The tube member 181 may be of polytetrafluoroethylene material known under the tradename "Teflon." The tube may have an outside diameter less than three inches and a wall thickness in the radial direction less than 1/4 inch. The inside of the Teflon tube 181 may be filled with a material of dielectric constant only slightly greater than one such as foamed polystyrene, foamed polyethylene or foamed "Teflon." For example, small hollow gas-filled polyethylene spheres may be used which on heating expand to fill any desired space uniformly and then set in the expanded state. The dielectric constant of the expanded material can be precisely controlled by weighing the quantity of the polyethylene spheres put into the body to be filled.

In place of "Teflon" it is possible that another good dielectric material may be used such as polyethylene or polystyrene.

A material such as "Fluorosint" can be used for the bend pieces 152 and 191 and the cylinders are of the required radius to effect the bending with minimum loss.

The radially outer bend members 154 and 190 may be of "Steatite" and have an overall diameter of .505 inch with a 90° bend channel therein of .070 by .070 inch.

*Second specific example in accordance with the embodiment of FIGURE 1*

In a second example in accordance with the embodiment of FIGURES 1 through 4, a thin coating of dielectric material overlies the exterior surface 150a of the wire 150 and may also overlie the wire 150 and may also overlie the exterior surface 181a of the dielectric tube 181. The outside diameter of the tube 181 may be three inches or greater.

The tube member 181 in this case may be made of porous alumina having a dielectric constant of about 4.23. The conductor 150 may be formed by etching and electrolytically depositing a thickness of .010 inch or less of a conductive material helically onto the exterior surface of the member 181. The electrolytically deposited conductor 150 and the tube 181 may then be covered with a spray coating of alumina material such as known under the trademark "Rockide" of about .005 inch thickness or greater.

Third example in accordance with the embodiment of FIGURES 1–4

In a third embodiment in accordance with FIGURES 1 through 4, the exterior surface 150a of the conductor 150 is again preferably in contact with the travelling web 10 with the outer layer of the second example omitted. The wall thickness of the tube 181 is critically related to the frequency and to the dielectric constant of the material of the tube and is preferably less than .15 inch. By way of example, the tube 181 may be of "Stycast-LoK" in certain applications. "Stycast-LoK" is manufactured by Emerson and Cumming, Canton, Massachusetts, and is composed of microspheres of glass in a binder. The material of tube 181 preferably has a thermal coefficient of expansion substantially equal to that of the metal conductor 150 which may be silver wire where tube 181 is of "Fluorosint" (which is manufactured by Polymer Corporation, Reading, Pennsylvania). "Fluorosint" resin is composed of polytetrafluoroethylene and ceramic fillers. Typically the dielectric constant of Fluorosint is 3.2; the wall thickness of the tube 181 must be adjusted accordingly by adjusting either the inside or outside diameter thereof. The outside diameter is preferably maintained at a fixed value, although this is not essential to successful operation.

Where the tube 181 is of relatively thin wall thickness, an inner supporting cylinder may be provided within the tube 181 and having a plurality of radially extending ribs extending therefrom and engaging the inner diameter of the dielectric tube 181. The ribs may be separated by an angle of 22½ degrees. It is found that 1/16 inch wide ribs have negligible effect on the transmission of the surface wave around the outer circumference of the coil 85. The ribs may have a radial extent of about .3 inch and the inner supporting cylinder may be made of the same material as tube 181 and should have substantially the same thermal coefficient of expansion as tube 181.

Preferably the motor 20 is omitted and the sensing head mounted for free rotation as a result of frictional contact between the sensing head and web 10.

The precise operating frequency for a given sensing head which has been constructed having a tube 181 of given thickness may be conveniently obtained by plotting the transmittance of energy from the launching end to the receiving end of the head in decibels as a function of supply frequency; from this plot the resonance peaks may be located for the particular head, and a klystron having the particular desired frequency may be ordered commercially for use with the head. The absorption peak of the substance such as moisture to be sensed is sufficiently broad so that several resonance peaks in head response will be found within the absorption peak of the substance.

In place of the right angle bend cylinders 152 and 191, a different method of conveying surface wave energy about a bend may be utilized. Thus, the conductor 150 in the region of the right angle bends from the axial to the radial direction may be coated with a dielectric material of substantial thickness. For example, a 20 gauge (.032 inch diameter) silver conductor may be coated with a .042 inch thickness of polyethylene in the region of the bend. The coating should have a thickness which is at least an appreciable fraction of a wave-length, for example at least 1/10 the wavelength.

Further modifications

Any of the foregoing examples may be applied to a full size paper roll of full machine width such as 20 feet and perhaps 20 inch diameter, to sense the moisture of a paper web across the full width of a paper machine either all in one measurement or divided into several parts. The division might be achieved either with a single microwave power source and a number of energy sampling points across the machine width or with a number of separate sources and detector systems.

Such a moisture sensing system may be segmented to correlate with moisture control apparatus having corresponding segments. Because the microwave moisture meter can be used up to high moisture content (in principle 100%) improved automatic control can be obtained with it by combining feed forward control with feedback control. One moisture meter or set of meters located near the wet end of the web, say after the presses, can control a drier steam valve or other moisture control apparatus located further down the machine so as to give instantaneous or anticipatory control, and a second moisture meter or set of meters located near the dry end of the web can control a second drier steam valve or moisture control device or modify the control exercised by the first moisture meter near the wet end so as to provide a stable and accurate feedback control.

A sensing head such as illustrated in FIGURES 1 through 4, which may be fixed rather than rotary, may be utilized to measure constitutents of fluid material, granular material, or slurry consistencies including slurries in the normal range of about 40% water. Such media can, of course, be continually fed past the sensing head which may be located in a suitable conduit or the like.

Other substances than water can, of course, be detected by a sensing head in accordance with the present invention. The following are four illustrative examples of substances to be detected other than water:

(1) $D_2O$ and HDO in $H_2O$ (or HDO in $D_2O$ and other such combinations).

Because the molecular resonances are strongly dependent on the constituent atomic masses, $D_2O$ and HDO exhibit resonance absorption at different microwave frequencies to those found for $H_2O$. For $D_2O$ a resonance exists at 10.9 kmc./s. which frequency could therefore be used to measure $D_2O$ in $H_2O$ but microwave absorption in $H_2O$ at this frequency, though substantially removed from the $H_2O$ resonance at 22.235 kmc./s., is still great enough to give only poor accuracy in the measurement of $D_2O$. For HDO, however, resonances exist at 800 mc./s., 2.4, 3.0 and 5.7 kmc./s. which can therefore give useful measurement.

Any of the above frequencies can, of course, be used for the measurement of $D_2O$ or HDO, in dielectric substance other than water. Other HDO resonances such as those around 22 kmc./s. and 50 kmc./s. could also be used. See Posener and Strandberg Phys. Rev. 95, 374, 1954.

(2) The molecular inversion transition in ammonia, $NH_3$ has a strong ground state resonance frequency at 23.78 kmc./s. which can be used for its measurement either in the liquid or gaseous state. For the inversion transition in ammonia the isotopic effect is particularly pronounced and simple making for ready measurement of $NH_2D$, $NHD_2$ and $ND_3$. The following tables show the microwave resonances.

|  | Ground State | | Excited State | |
| --- | --- | --- | --- | --- |
|  | Frequency, kmc./s. | Wavelength, cm. | Frequency, kmc./s. | Wavelength, cm. |
| $NH_3$ | 23.78 | 1.26 | 1095 | .027 |
| $NH_2D$ | 12.19 | 2.48 | 592 | .051 |
| $NHD_2$ | 5.11 | 5.88 | 295 | .102 |
| $ND_3$ | 22.7 | 1.32 | 117 | .256 |

Thus 12.19 kmc./s. can be used effectively to measure $NH_2D$. 5.11 kmc./s. can be used for $NHD_2$ and 117 kmc./s. can be used for $ND_3$. 23 kmc./s. would measure the total of $NH_3$ and $ND_3$.

(3) Methyl alcohol, $CH_3OH$ is an asymmetric rotor with a strong resonance absorption in the region of 25 to 31 kmc./s.

Spectroscopic techniques applied to the gaseous state at very low gas pressures show a whole series of lines between 25 and 31 kmc./s. which are attributed to hindered torsional motion.

In the higher concentrations to which my measurement techniques are applicable, and in the liquid state these lines are broadened so as to produce a single broad resonance between 25 and 31 kmc./s. similar to that for water in the region of 22 kmc./s.

(4) Nitromethane, $CH_3NO_2$ is an oily liquid used in rocket fuel. It has a boiling point at 101.2° C. and is poisonous. Like methyl alcohol it is an asymmetric rotor and exhibits hindered torsional motion. The resulting broad absorption band lies between 30 and 34 kmc./s.

Many other possibilities exist for the use of my microwave measurement techniques and I would refer to National Bureau of Standards circular 518 "Tables of Microwave Spectra," by Kisliuk and Townes.

Under the conditions in which my measurement techniques are applicable the resonances are broad and it is evident that those due to many substances overlap each other. The method is thus applicable to systems in which the constituents are known and it is desired to measure accurately the quantity present of one of them for which a strong microwave resonance exists and which is well separated from resonances due to all the other constituents.

Embodiments of FIGURES 5, 6 and 7

The sensing head of FIGURES 1 through 4 may be moved transversely of the direction of web movement to scan successive sections of the web in sequence, and FIGURES 5 through 7 may be taken as illustrating such applications of the embodiment of FIGURES 1 through 4 as well as illustrating suitable electric circuitry for utilization in connection with the embodiment of FIGURES 1 through 4.

Embodiment of FIGURES 5 and 6

FIGURE 5 illustrates an embodiment in accordance with the present invention wherein a sensing head 600 for sensing a constituent of material or the like is mounted on a traversing carriage 610 for traversing movement along the width dimesion of a moving web 612 as generally indicated by the double headed arrow 614. The web 612 is indicated as travelling in contact with the underside of a suitable web support such as a roll or the equivalent. In FIGURE 5, a roll 620 is specifically illustrated which is rotatable in suitable bearings on a pedestal or machine frame comprising parts 622 and 623. The machine frame parts 622, 623 are shown as being rigidly secured to a floor or equivalent rigid structure diagrammatically indicated at 625.

The traversing carriage 610 is indicated diagrammatically as being mounted for transverse movement along a suitable track or guide means 630' rigidly secured to the structure 625. The track or guide means 630' thus serves to maintain the sensing head 600 in rigidly spaced relation to the surface of web 612 where the web is supported by the roll 620. It is contemplated that the angle at which the web approaches and leaves the roll 620 will also be precisely determined so that the portion of the web within the field of the sensing head 600 will remain constant as the traversing carriage 610 moves the sensing head across the width of the web. For example, where the roll 620 has a metal conductive external surface and the surface wave transmission line 630 has an exterior surface of steel or the like, the system may serve to maintain the spacing between the external surface of the line 630 and the metal external surface of roll 620 at a fixed distance which is preferably equal to less than ten times the wavelength of the microwave energy transmitted along the line 630.

The roll 620 may be provided with a suitable coupling as indicated at 632 so as to be driven by suitable means if desired. The roll 620 is of course precisely mounted so as to precisely maintain the level of the web relative to the level of the sensing head 600 across the entire width of the web 612.

Suitable means may also be provided for causing the traversing carriage 610 to be moved back and forth along the guide means 630' at a desired speed so as to cyclically scan the entire width of the web 612 if desired.

In the embodiment of FIGURE 5, it is preferred to have the axis of the sensing head 600 parallel to the axis of the roll 620 and directly below the region of contact between the web 612 and the roll 620. Thus, for the illustrated vertical orientation in FIGURE 5, where the web 612 engages the roll 620 over a substantial arc on each side of the lowest part of the roll, the axis of the sensing head 600 is preferably directly vertically below the central axis of roll 620.

FIGURE 6 illustrates one form of sensing head for use in the embodiment of FIGURE 5. The sensing head of FIGURE 6 may comprise a horizontal metal plate 650 rigidly secured to the framework parts 653 and 654 of traversing carriage 610 by any suitable means. Arms 657 and 658 which may also be of metal plate construction are illustrated as rigidly secured to the plate 650 and as supporting a surface wave transmission line assembly 660 at the upper ends thereof. By way of example, the surface wave assembly 660 may comprise a cylindrical core 662 secured at its opposite axial ends to the arms 657 and 658. The core exterior may have a helical groove formed therein as indicated at 664 for receiving the surface wave transmission line 630 as a helical coil.

In the illustrated embodiment, microwave energy is delivered to the line 630 from a microwave source 670 via a rectangular waveguide 671 and a coupling device 673. At the opposite end of the line 630 a coupling device 675 couples the transmitted microwave energy to a rectangular waveguide 676 having a suitable non-reflecting termination 678. Suitable detector means are indicated at 680 and 681 coupled to the waveguide 671 and 676 for sensing the input and transmitted power of the system. A suitable amplifier is indicated at 685 coupled to the outputs of the respective detectors as indicated by lines 686 and 687 for obtaining a difference signal to be delivered to a servo motor 690 via a line 691. The servo motor 690 is coupled as indicated by dash line 693 to a variable attenuator 695 associated with the detector 680 so as to maintain the outputs from detectors 680 and 681 equal. The detectors 680 and 681 have been indicated as crystals 697 and 698 associated with suitable directional couplers 699 and 700.

The metal frame parts such as 650, 657 and 658 may, of course, be sufficiently spaced from the entering transmission line section 630a and the leaving transmission line section 630b and the coil part 630c so as to be substantially outside of the influence of the microwave energy associated with the line. In the alternative, suitable microwave absorbing means may be provided such as indicated by the dash line 702 for effectively isolating all of the interfering surfaces from the energy of the line. A suitable microwave absorber is known as "Eccosorb." Preferably, the transmission line assembly 660 is spaced a greater distance from the support plate 650 than from the web indicated at 612. It is contemplated that the surface layer of the roll 620 indicated at 620a in FIGURE 6 which engages and supports the web 612 may be of either a metal or dielectric material.

By way of example, if line 630 comprises an uncoated electrically conductive wire of a material such as steel, a spacing between the line and the metal surface 620b of roller 620 of from approximately 1 millimeter to approximately 10 wavelengths would be usable. A spacing between one-half and two times the wavelength is preferred. Thus, where the system is employed for sensing moisture content and a resonant absorption wavelength of 1.35 centimeters is utilized, a spacing between about .7 and 2.7 centimeters is preferred, while a spacing about 1 millimeter to about 15 centimeters would be usable.

Where the line 630 comprises a conductive wire or the like having a dielectric coating or a modified surface, the energy of the field is effectively restricted, and a spacing between the line and the metal surface 620b could range from the minimum possible to a little more than 1 wavelength, while preferably the spacing would be less than ½ wavelength.

Alternatively, the roll 620 could have a surface layer 620a of dielectric material. A thin coating on the roll of any practical thickness for example 1 inch but preferably not less than ⅛ inch would be suitable. The diameter of the roll 620 would not be critical where such diameter is large in comparison to the cross sectional dimensions of the line 630. The dielectric surface corresponding to surface 620b in FIGURE 6 preferably would not be less than ½ wavelength from the line 630 unless the line 630 is also dielectric coated. With the line 630 comprising an uncoated conductor of steel for example spacings between the outside diameter of coil 630c and the dielectric surface of the roll 620 closer than ½ wavelength would tend to cause diffraction of the wave energy from the intended path. On the other hand, where the surface of the line 630 has a dielectric coating or is otherwise suitably modified to restrict the energy of the microwave field, spacings less than one-half wavelength between the line and the dielectric surface of the roll would be satisfactory.

FIGURE 7 illustrates a sensing head 600 which may be identical to the head of FIGURE 6 but which is arranged so that its axis is generally parallel to the direction of movement of the web 612 which direction of movement is indicated by arrow 720. The spacing between the sensing head 600 and the roll 620 and the surface characteristics of the roll may be the same as described for FIGURE 6. The roll 620 in FIGURE 7 has been illustrated as being mounted by means of suitable framework 722 for rotation on its central axis as in FIGURE 5. Suitable means may be coupled to the roll 620 for driving the same. Web guiding means have been diagrammatically indicated at 725 and 726 for positively maintaining a desired web geometry within the influence of the field of the sensing head 600. This same arrangement may apply to the embodiment of FIGURE 5.

As in the previous embodiment, a rigid spacial relationship is maintained between the roll 620 and the sensing device 600 by means of a common rigid structure indicated diagrammatically at 730 in FIGURE 7 which is rigidly secured to the support frame 722 and to guide means or tracks indicated diagrammatically at 732 for carriage 733 rigidly mounting the sensing head 600. Suitable means may be provided for cyclically moving the carriage 733 along the guide tracks 732 as in the embodiment of FIGURE 5 to cyclically scan the entire width of the web 612.

By way of example, the guide means 725 and 726 may comprise cooperating sets of driven rollers driven so as to maintain the web 612 taut therebetween.

Microwave power guided along an open conductor which follows a curved path suffers appreciable loss probably due to radiation from the conductor. To a first approximation, it appears that the loss in decibels per unit length of wire is nearly proportional to the inverse of the radius of curvature. There are indications, however, that as the radius of curvature is reduced to the order of one wavelength, the losses increase still more rapidly.

It has been found that this loss due to curvature can be reduced or even eliminated by adding a dielectric on the inside of the curve, for example as indicated at 662 in FIGURE 6. It seems that the dielectric acts with the microwave energy somewhat analogously to glass with light and refracts the wave so that it follows the conductor indicated in the form of a helical coil at 630c in FIGURE 6. Transmission around a coil has been effected virtually without loss.

For lossless transmission, it is essential that the radius of curvature be correctly proportioned to the dielectric constant of the dielectric. With too large a radius of curvature, the wave is refracted off the conductor into the dielectric (as with a dielectric placed on one side only of a straight conductor. With too small a radius of curvature, the refraction is insufficient and some of the wave is radiated outward.

On the inside of the curve, in the dielectric, the wave energy is almost wholly confined to a narrow region close to the conductor. This confinement is due to the dielectric. The distance traveled by the wave in passing around an arc subtending an angle $\theta$ of a circle of radius $r$ is therefore $r\theta$. The speed of the wave in the dielectric is $c/\sqrt{e}$ where $e$ is the dielectric constant. Therefore, the time required to traverse the arc $r\theta$ is $\theta/c(r\sqrt{e})$.

On the outside of the curve, in air, the wave energy will spread over a distance from the conductor which may be several wavelengths for a good conductor, uninsulated and with a smooth surface or about half a wavelength if the conductor has a thin dielectric coat or has a roughened or corrugated surface. For a partially confined wave, the mean radius of curvature for the wave in air is approximately $r+\lambda/4$. Since $c$ is the speed of the wave energy in air, the time required to traverse the angle $\theta$ is $\theta/c(r+\lambda/4)$. It is found that satisfactory transmission around a curve is obtained if the radius of curvature and the dielectric constant are matched so that the traverse time on the inside and outside of the curve are equal, that is $$\frac{\theta}{c}r\sqrt{e}=\frac{\theta}{c}\left(r+\frac{\lambda}{4}\right)$$

so that $r\sqrt{e}=r+\lambda/4$. While this relationship has been found to give a satisfactory result, it does not necessarily give the optimum condition.

Some further improvement in transmission around a curve may be obtained by using a thick conductor, so that the wave on the outside surface of the conductor has further to travel than on the inside surface. A tapered dielectric coating may be supplied to the conductor to match or synchronize the wave travel at all points around the conductor surface including side surface portions as well as outer surface portions and inner surface portions.

A coil may be close or open wound. For a close wound coil where the microwave energy associated with one turn is closely coupled with the microwave energy of an adjacent turn and for a closed loop the length of the loop or of the multiple loops forming a coil is preferably such that the microwave energy which travels about a loop and returns to a point at or adjacent to the entrance point of the loop will have a predetermined phase relation to microwave energy entering the loop. It is found that the characteristics of a loop for a given microwave frequency are critically related to the length of the loop in relation to the wavelength of the microwave signal. Where the length of the loop is equal to a whole number of wavelengths, the field due to the microwave energy entering the loop will be reinforced by the field of the microwave energy which has traveled about the loop and has returned to or adjacent to the entrance point of the loop. If the length of the loop is an odd multiple of ½ wavelength, the field due to the entering microwave signal will be opposite the field due to the microwave energy which has traveled about the loop so that the loop acts as a reflector of the microwave power.

When the length of the loop is adjusted for reinforcement, if the losses around the loop amount to 10%, then the power circulating in the loop must be 10 times the input power before the losses will balance the input. Loop losses as low as 0.1% should be easily obtainable, giving gains in field strength of 1000 times. Thus if a loop type microwave device adjusted for reinforcement is used to detect moisture in paper, a 1% absorption of microwave energy by moisture in the paper would drop the circulating power in the device by a factor of 10 (i.e. 10 db drop from 1000 times) and a 10% absorption would drop the circulating power to 10 times (or a further 10 db drop).

Since the loop length is a whole number of wavelengths for maximum gain, a loop device in accordance with the present invention can be utilized as a wavemeter. Since the device is highly frequency sensitive, the device can also fulfill the same function as a cavity resonator.

It is found that microwave power can be induced from one coil or closed loop to another coil or closed loop placed in close proximity, and in a similar manner to that commonly practiced at lower frequencies in the audio and radio frequency part of the spectrum but never previously attempted at microwave frequencies. At microwave frequencies there are, of course, the special requirements noted above with respect to the means for preventing radiation loss from the coil and with respect to the proportioning of the length of the loops with respect to the wavelength of the applied microwave energy.

An effective microwave attenuator can be obtained by winding a coil using resistance wire of a few ohms per inch. As a terminating attenuator, the far end of the coil may be simply left open ended. A terminating attenuator for 22,000 megacycles per second was constructed comprising 10 turns of resistance wire wound on a core of "Teflon" which is a tetrafluoroethylene resin material having a dielectric constant of about 2. The core had a diameter of 1¼ inches and the total resistance of the wire wound on the core was 240 ohms. There was no detectable standing wave on the conductor leading to the attenuator, showing that it was a very effective totally absorbing termination. A similar coil of 7 turns gave 20 db attenuation through the coil.

It is noted that using a material of dielectric constant 6 (for example a suitable ceramic such as that manufactured under the trade name "Pyroceram"), an effective attenuator for use at 22,000 megacycles per second can be made by winding resistance wire on a dielectric core of about 0.5 centimeter diameter. Such an attenuator closely resembles a common wire wound electronic resistor in both appearance and function, but the similarity is only superficial because the common electronic resistor has no critical relations between its dimensions and wavelengths, and its operation is entirely different. For example, the conventional electronic resistor would be inoperative with one end open circuited and would not be provided with surface wave coupling means for connecting the same in a single conductor surface wave transmission line.

For high frequencies and particularly about 100,000 megacycles per second, for which the wavelengths are less than 3 millimeters, a dielectric of small dielectric constant would be desirable. For example, at 200,000 megacycles per second a "Teflon" core would have to be about 2 millimeters diameter which may be inconveniently small. A suitable material might be obtained by "foaming" a core of "Teflon" so as to produce a material, for example about 30% "Teflon" and 70% air. Such a material could be expected to have a dielectric constant of about 1.3, which at 200,000 megacycles per second would call for a core diameter of about 0.5 centimeter.

A variable attenuator can be obtained by providing a tapered axially shiftable dielectric core in conjunction with a closed loop or coil. Also, a porous dielectric core could be used and a variable attenuator obtained by inserting more or less of an absorbing gas or liquid in the porous core. Attenuation can be frequency selective by molecular resonance of the absorbing gas or liquid.

With respect to the embodiment of FIGURES 6 and 7, it has been found that at certain critical frequencies in the microwave region, for example approximately 22,000 megacycles per second, the microwave energy transmitted along a wave guide may be relatively unaffected by the presence of a paper web while being critically sensitive to the moisture content of the web. The microwave source such as indicated at 670 in FIGURE 6 may deliver microwave energy to wave guide 630 at such resonance absorption frequency for water if it is desired to determine the moisture content of the paper web 612.

The coil 630c is preferably proportioned as described above so as to provide reinforcement of the wave energy at successive turns of the coil at the excitation frequency.

The dielectric mass indicated at 662 is so proportioned in relation to the dielectric such as air on the outer side of the coil to cause the microwave energy to travel about the coil without substantial loss as described above.

In FIGURE 6, points 815 and 816 on coil 630c may be separated by less than a half wavelength, for example ¼ inch for a wavelength of 1.35 centimeters. The electrical length of each loop path is preferably an even number of half wavelengths to provide reinforcement at corresponding points on the respective loop paths, such as points 815 and 816.

It will be observed that a portion of the periphery of the coil 630c is in proximity to the web 30. With relatively thin webs in comparison to the wavelength of the microwave energy transmitted along the coil, no special provision may be necessary to prevent undue radiation of microwave energy at the portion of the coil coupled to the paper web. In fact, the tendency of the microwave energy to be retarded at the region of impingement on the dielectric medium may amplify the effect of the presence of moisture in the paper web and provide a greater apparent power loss.

If it is desired to compensate for the retarding effect on the wave energy of the presence of the web, the region of the coil coupled to the web may be provided with a larger radius of curvature than other portions of the coil so that the retarding effect of a dry paper web, for example, at the region would provide a wave velocity related to the wave velocity at the inner side of the coil in dielectric medium 662 such as to prevent undue radiation from the coil at the region.

As an alternative to detecting the constituent by means of its absorption effect with respect to microwave energy, it would be feasible in all of the embodiments described herein to use a system depending on change of phase of the microwave energy.

The principle can be illustrated by reference to seventeenth figure of my application Ser. No. 84,657 in which the microwave energy is divided at element (543) so that part travels by the sensing path through elements (555), (557), (540) and (557a) to detector (560), and part travels through elements (544) and (545) to detector (547).

If the relative phase of the signals received at detectors (547) and (560) is detected or measured, the change in phase resulting from the presence of the web (518) will serve as a measure of the constituent in the web in accordance with a previous calibration.

The phase detectors used at positions (547) and (560) might be mixers powered from the same local oscillator. The two heterodyne signals could then be amplified and fed to the X and Y plates, respectively, of an oscilloscope or other suitable phase comparator.

A variable microwave phase shifter could be used in place of the attenuator (545) and adjusted to maintain the two signals at detectors (547) and (560) in constant phase relationship, as indicated by the oscilloscope or other device. The position of the phase shifter would then provide a measure of the constituent in the web (518).

It will be apparent that the different electrical systems for sensing the desired result in any of the embodiments or modifications described may be applied to any of the other embodiments. Frequency modulation may be utilized in any of the embodiments, and in addition to a mechanical modulating system described in my application Ser. No. 84,657, frequency may be modulated by suitable control of the electrical supplies which furnish power to the oscillator. While, for convenience, certain orientations have been referred to in describing various figures, these orientations should not be construed as limiting; for example in FIGURES 5 and 7, the web could travel over the top surface of a roller, and the sensing head be suspended from a suitable rigid member such as an I-beam rigidly carried by the same supporting structure which mounts the roll. In each of the embodiments, the cross section of the transmission line may be any of the cross sections herein disclosed, and of course other cross section configurations may be utilized as will be apparent from the teachings herein.

Since the head of FIGURES 1 through 4 may be substituted for the head 600 in FIGURES 5, 6 and 7, the various embodiments and description with reference to FIGURES 5 through 7 are directly applicable to the embodiment of FIGURES 1 through 4 and are specifically applied thereto. Further, the disclosure in my copending applications Ser. Nos. 753,987 and 84,657 are specifically incorporated herein by reference with respect to each of the embodiments.

In any of the embodiments when utilized to sense moisture content, the microwave energy preferably has a frequency of 22,235 megacycles per second which is a resonant frequency for the water molecule. Absorption of electromagnetic energy of this frequency causes a change in the rotational energy of the molecule. There is some small absorption in dry paper fiber, but this appears to be the same for all finishes and coatings, and a universal moisture calibration has been obtained for all papers tested so far. This calibration can be done in the laboratory and the instrument when installed on paper machinery should give an absolute accuracy ±0.25 in the measurement of percent moisture content. The relative accuracy from one point in the sheet to another should be ±0.1% H$_2$O or ±1% of the value indicated, whichever is greater (these two tolerances are the same at an indicated reading of 10% H$_2$O).

The absorption of the energy, measured in decibels, by the water in the sheet is not directly proportional to the total mass of water within the sensing zone but appears to obey the following formula:

$$F=KW^2+C$$

where

A is the absorption in decibels
F is the sheet weight dry
$n$ is a constant slightly less than or equal to one
W is the percent water content
K and C are constants The fact that $n$ may be slightly less than one means that the absorption by two identical sheets laid one on top of the other may be slightly less than double that due to one sheet. This is thought to be due to the fact that the field falls off proportionately with the distance from the surface of the sensing head. If this is correct, variations in caliper and in the location of the water in the sheet may cause some error, but even for heavy board grades this will not exceed the tolerances quoted above. (It is noteworthy that the energy does not fall off with the square of this distance from the surface of the particular type of wave guide which I use.) In my laboratory model, which has a cylindrical sensing element 1.2″ O.D., $n=0.886$. For the production models which have larger diameter cylinders, $n$ has been found to be equal to one.

The fact that the absorption is proportional to the second power of the percent moisture was unexpected but has been repeatedly confirmed and is further illustrated by the fact that the absorption by water condensed in paper is about three orders of magnitude greater than by the same quantity of water in the vapor-phase where the concentration is substantially less by about three orders of magnitude. According to the formula, the absorption is proportional to the number of molecules present and to their concentration.

The physical form of my sensing head will be a cylinder, 2 inches or more in diameter which will rotate freely in contact with the sheet. The sensing length will be about 3 inches. The unit will be entirely on one side of the sheet and can be arranged to traverse across the sheet width, if desired.

The meter will be arranged to read out directly in percent moisture, the effect of basis weight changes being taken care of by means of an adjustable control which can be set manually or adjusted automatically by a basis weight measuring instrument mounted alongside the moisture measuring unit. In the latter case, the read out from the basis weight meter can be arranged to be as bone dry basis weight.

In the case of a traversing unit, the read out would be on an X–Y recorder with position across the machine on the X-axis and the moisture percent on the Y. An integrated reading, giving the mean moisture content of the whole sheet, would also be displayed.

The term "surface wave" is utilized to refer to wave energy conducted along a surface sharply separating two media of different electric properties such as to exert a guiding effect on the electromagnetic wave. The surface separating a conductor from an insulator, or the surface separating two different insulators of markedly different dielectric constants may be utilized. Such surfaces will herein be termed "surface wave transmission lines" when utilized to guide microwave energy as a surface wave. It will be appreciated that the method of the present invention is particularly applicable to materials which absorb relatively little microwave power at one or more frequencies which frequencies are readily absorbed by moisture contained in or on the material. The term "moisture content" is utilized herein to comprehend moisture contained either on the surface of the material or in the material, or both.

The present invention is, of course, applicable to determining the moisture content of stationary as well as moving webs. Generally, the invention is directed to detecting the moisture content of non-metallic inorganic materials and organic materials. It is contemplated that the invention will have particular application to cereals, dried foods, flour, breakfast foods, bakery mixes, dehydrated proteins, carbohydrates and cellulose materials.

In each of the embodiments, the microwave generating means preferably generates a frequency which is a resonant frequency with respect to the constituent of the material to be sensed while the frequency is such as to be relatively unaffected by the material itself. While troubles from standing waves due to reflection of microwave energy do not seem to be serious with single conductor surface wave transmission lines, each of the microwave generating means of the disclosed embodiments may generate a frequency modulated microwave signal so as to average out any small effects which may exist. Frequency modulation will reduce the criticality of the thickness of the dielectric coating on the transmission line where such is provided and will reduce the effects of variations in this thickness along the length of the line. By way of example for sensing moisture content in any of the illustrated embodiments, the frequency of the microwave generator may be varied over a range of 1250 megacycles per second, for example between 21,500 and 22,750 megacycles per second. The microwave power in any of the embodiments may be generated by means of a suitable klystron having a cavity whose dimension may be varied by mechanical means. The mechanical means may be controlled by means of a solenoid energized so as to cyclically vary the frequency generated by the klystron over a frequency range such as indicated above. If crystal detectors are utilized, pulse modulation may be introduced to provide an electrical variation of the power supply to the klystron at a suitable low frequency rate. The klystron electric supply power may be varied in step with the mechanical variation of the cavity as needed to maintain operation of the klystron at substantially constant power level. A suitable attenuator for adjusting the power transmitted from the klystron may also be provided in each of the embodiments.

In each of the embodiments described or shown in the drawings, the waveguide may comprise a member having an exterior surface which is a good electrical conductor, rather than a semi-conductor or insulator. For example, the member may be of hardened steel and be in sliding contact with the material under test depending upon the nature thereof. Alternatively, in each of the embodiments, the waveguide may comprise a metallic conductor having a thin coating of wear resistant material which may be in sliding contact with the material under test, a suitable coating being an aluminum oxide ceramic known as "Rockide." In the case of an open wire waveguide of this type, the microwave energy will surround the guide and extend approximately the distance of one wavelength from the external surface of the guide.

In each of the embodiments where there is a dissymmetry with respect to the dielectric constant of materials in the space about the transmission line, velocities may be equalized to reduce radiation from the line to a desired minimum.

It will be understood that in general the detecting means and electrical components of one embodiment may be applied to any of the other embodiments and such variations should be considered as specifically disclosed herein.

The term "conductor" is used herein in a broad sense to include good conductors and semi-conductors but to exclude dielectrics, or non-conductors of electricity.

The term "transmission line" is used herein to cover waveguides generally regardless of cross-section, and is intended to comprehend waveguides of either conductive or dielectric material. The term "constituent of material" is intended in its broadest sense to cover substances within or on a material and capable of differentially affecting microwave energy. The constituent may, of course, be an impurity rather than a normal part of the body of material.

*Embodiment of FIGURES 8 and 9*

The embodiment of FIGURES 8 and 9 corresponds to the third example in accordance with the embodiment of FIGURES 1 through 4 described previously, but the embodiment of FIGURES 8 and 9 represents further details of the presently preferred embodiment and constitutes as presently advised the best mode of practicing the present invention.

FIGURE 8 is a view similar to FIGURE 1 showing an improved sensing head with portions broken away and shown in section in accordance with the section line VIII—VIII of FIGURE 9.

FIGURE 9 is a transverse sectional view taken along the section line IX—IX of FIGURE 8.

Referring to FIGURE 8, the reference numeral 800 designates a sensing assembly which may be mounted on a suitable housing as in the preceding embodiments and traversed laterally of the direction of movement of a web 801 shown in FIGURE 9. The web 801 is transported by means of drive rollers indicated diagrammatically at 802 and 803 in the direction of arrow 804 with the surface of the web 801 in direct contact with the external surface 806 of the sensing head 800. In the illustrated embodiment, a surface wave transmission line is provided by means of a conductor 807 arranged in a helical coil in grooves of a thin dielectric tube 808. The cross section of the helical groove in tube 808 is illustrated as being semi-circular in conformity with the semi-circular cross section of the conductor 807. Thus, a diametric surface of the conductor 807 is flush with the surface 806 and is in direct contact with the moving web 801.

The sensing head 800 further comprises a ribbed cylinder 810, best seen in FIGURE 9, and having a series of ribs 811 terminating in supporting relation to the thin cylinder 808. The cylinder 810 preferably has substantially the same coefficient of thermal expansion as cylinder 808 and may be of the same dielectric material. The spaces between the successive ribs such as indicated at 813 may be filled with a dielectric material such as air having a dielectric constant of approximately one.

The sensing head 800 further comprises an inner cylinder 815 which may be of metal such as aluminum. The inner cylinder 815 is secured to end rings 816 and 817 by means of screws 818 and 819, and the end rings 816 and 817 are secured to horns 820 and 821 of metallic material such as aluminum by means of screws such as indicated at 824 and 825. The horns 820 and 821 are mounted on supporting arms 830 and 831 by means of bearings indicated diagrammatically at 832 and 833.

As indicated diagrammatically in FIGURE 8, a source of modulated microwave energy 840 is coupled to a rectangular waveguide 841 for coupling the microwave energy to a conductor 842 which is connected with the conductor portion 807a which is part of the conductor 807. The only tuning adjustment required is the adjustment of the rectangular cross section waveguide short member 845 which may be manually adjusted by means of a handle such as provided by the head of screw 846. The short circuit member 845 may be retained in its adjusted position by means of its frictional engagement with the waveguide 841, or any suitable means may be provided for adjustably fixing the position of the waveguide short member 845. The conductor 842 rotates with the conductor part 807a and a suitable bearing for the conductor 842 is indicated at 850. A retainer member 851 may be secured to conductor 842 by means of a set screw 852 and may have a reduced diameter portion on which the bearing 850 acts. Specifically, the head portion of the retainer member which receives the set screw 852 may have a diameter of one-half inch an an axial extent of 3/16 of an inch. Immediately adjacent to the head portion may be a shoulder portion having a diameter of one-quarter inch and an axial extent of approximately 0.3 inch. Beyond the shoulder portion is an axially projecting bearing portion within bearing 850 having an outside diameter of approximately .1876 inch and an axial extent of approximately .156 inch. The overall axial extent of the retainer member 851 is thus 3/8 inch. The member has a central bore of 1/16 inch diameter extending entirely therethrough for receiving the conductor 842 which in this case may also have a 1/16 inch diameter so as to fit snugly within the bore indicated at 853 of the retainer member 851. The retainer member may be of aluminum, for example.

The outer race of the bearing 850 may be secured to a rotary joint member 855. The rotary joint member 855 may have an outside diameter of 1¼ inches for an axial extent of approximately .45 inch, then an outside diameter of about .374 inch for an axial extent of .05 inch, and then have an outside diameter of 260 inch for an axial extent of .085 inch. The right hand end of the rotary joint member 855 as viewed in FIGURE 8 may have an internal bore of .070 inch diameter for an axial extent of .110 inch. The member 855 may be made of brass.

The support arm 30 may include an aluminum support member 860 having a rectangular recess centrally at the left hand face as viewed in FIGURE 8 to receive the waveguide 841. This recess may have a depth of .250 inch and a width of about .504 inch. At the upper end of the support member 860 is a flange 860a having an outside diameter of 2¼ inch and an inside diameter of 2 inches. The axial extent of this flange is .500 inch. Inwardly of this flange, the member 860 is provided with a recess receiving the outer race of bearing 832 and having a diameter of approximately 1.1027 inches and an axial extent of about .315 inch. Inwardly of this is a shoulder portion having an inside diameter of 15/16 inch and a thickness or axial extent of about .005 inch. To the left of this shoulder portion as viewed in FIGURE 8 is a reduced diameter portion having an internal diameter of about .750 inch which receives a brass adaptor 861. The member 860 may have a pair of threaded holes arranged on a diameter of one inch with respect to the central axis and lying in a horizontal plane through the central axis. The rotary joint member 855 has corresponding holes arranged on a one inch diameter for receiving screws engaging in the threaded holes of member 860 to secure the rotary joint member in fixed relation to the support member 860.

The brass adaptor 861 may have an outside diameter of about .750 inch and have an internal diameter of about .3385 inch for an axial extent of about .172 inch and then have a reduced diameter portion having an inside diameter of about .251 inch with an axial extent of about .075 inch. Within the brass adaptor 861 is a choke outer conductor member 863.

The choke outer conductor member 863 has a radially projecting flange with an outside diameter of about .338 inch and an axial extent of about .042 inch. To the left of the flange as viewed in FIGURE 8 is a reduced diameter body portion having an outside diameter of about .249 inch to fit through an aperture in the brass adaptor 861 having an internal diameter of .251 inch. The .249 inch diameter portion of the choke outer conductor member 863 may have an axial extent of .115 inch approximately. To the right of the .338 inch diameter flange of the choke outer conductor 863 extends a further reduced diameter portion having an outside diameter of .217 inch and an axial extent of about .265 inch. The entire choke outer conductor member 863 may have an inside diameter of .177 inch and the member may have an overall axial extent of .422 inch.

Within the rotary joint member 855 is located a choke section 865 having an outside diameter of approximately .499 to fit snugly within the .500 inch diameter bore of rotary joint member 855. The maximum diameter portion of choke section 865 may have an axial extent of about .190 inch as compared with an axial extent of .375 inch for the .500 inch bore of rotary joint member 855 which also receives the bearing 850. At the right hand side of choke section 865 as viewed in FIGURE 8 is a reduced diameter portion having an outside diameter of about .090 inch and an axial extent of about .075 inch. At the left hand side of the choke section 865 adjacent bearing 850, the choke section 865 is recessed centrally to provide a cylindrical recess having a diameter of 3/8 inch and a depth in the axial direction of .010 inch. The choke section 865 may be of aluminum or brass and have an overall axial extent of .265 inch with an axial bore centrally thereof having a diameter of .070 inch approximately to freely receive the 1/16 inch outside diameter conductor 842.

The horn member 820 may have an outside diameter of 2 5/16 inches and an axial extent of 3/8 inch. To the left of the maximum diameter portion, the outside diameter of the horn tapers at an angle of 9° for an axial distance of about .560 inch. To the left of the tapering portion is an annular groove having a width or axial extent of 1/16 inch and a depth in the radial direction of 1/32 inch with a diameter at the bottom of the groove of about .4413 inch. To the left of the groove is a constant diameter portion receiving the bearing 32 and having an external diameter of .4725 inch approximately. This constant diameter portion may have an axial extent of about .315 inch including the width of 1/16 inch of the annular groove.

At the left end of horn 820 as viewed in FIGURE 8 is a relatively large constant diameter bore having a diameter of .237 inch and an axial extent of .135 inch. To the right of this relatively large diameter bore is a smaller diameter bore having a diameter of .177 inch. This constant diameter bore connects with a flaring aperture defining an angle with respect to the axis of the bore of 22° and 50 minutes of arc terminating in a maximum diameter of 5/8 inch. The axial extent of the .177 inch bore and the flaring portion together is about 1.115 inches.

The horn section 820 has four holes on a 1.500 diameter for receiving screws such as indicated at 824. Radially outwardly of this on the right hand end face of horn section 820 is an annular groove extending from a diameter of about 1.747 inches to a diameter of 2 1/4 inches and having a depth in the axial direction of .062 inch for receiving the tube 815.

The conductor section 807a may have a diameter of about .04 inch and may extend into a central bore at the end of the conductor 842 which may have a diameter of 1/16 inch so as to provide a firm mechanical connection between the two conductor parts which connection may then be soft soldered.

The telescoping and soft soldered joint between conductor parts 807a and 842 may be located in the region indicated by reference numeral 870 in FIGURE 8.

Beyond the joint 870, conductor part 807a fits snugly within a polyethylene tube 871 which may have a 1/8 inch outside diameter, and a .040 inch inside diameter. Alternatively, the dielectric tube 871 may be of "Teflon." The purpose of the dielectric tube 871 is to guide the surface wave launched along the conductor section 807a particularly in the case where the conductor section 807a must curve slightly away from the central axis to reach a point such as indicated at 807b in FIGURE 9 from which the conductor 807 extends radially as indicated at 807c and then curves to a tangential portion 807d before curving into the circumferential portion indicated at 807e. The flaring opening of horn section 820 is preferably filled with a cone 875 having substantially the same coefficient of thermal expansion as the cone section 820 for rigidly holding tube 871 in a precise axial position where it extends centrally of the flaring section of horn 820. In the example given, the dielectric tube 871 has a wall thickness of about .04 inch. Where the tube 871 is to guide surface wave energy about a substantial curvature, to minimize loss, the wall thickness of the tube 871 should be at least an appreciable fraction of a wavelength of the transmitted energy, for example at least 1/10 the wavelength.

For guiding the surface wave energy at the conductor portion 807c shown in FIGURE 8 at the conductor portion 807f shown in FIGURE 9, a pair of bend sector assemblies 875 and 876 are provided for guiding the microwave energy first about an arc of 90° in a generally axially directed plane and then about an arc of approximately 104° in a plane generally transverse to the axial plane. The two bend sector assemblies 875 and 876 may be formed of mating sector parts of "Fluorosint"; the two sector parts of each assembly may have a thickness dimension of about .250 inch and may have a curved edge formed on a diameter of about .650 inch. The two parts of each assembly may be secured together by means of a screw extending through an aperture in one part and engaging a threaded hole in the other part, the mating holes of the screws being located on a radius of 3/8 inch. Each sector part has a groove arranged on a radius of about .570 inch, the groove having a radius of about .021 inch so that the assembly has an arcuate passage therethrough with a diameter of about .042 inch. The passage of assembly 875 has an arcuate extent of 90°, while the passage of assembly 876 has an arcuate extent of 104°.

Beyond the bend sector assembly 876, the conductor section 807d extends within a critical angle launching piece 880. The piece 880 has an outer arcuate face engaging with the interior cylindrical face of tube 808. The tube 808 has an aperture with a diameter of .039 inch receiving the conductor as it leaves the central aperture of launching piece 880. By way of example, where the inside diameter of tube 808 is approximately 2.686 inches, the axis of the hole in tube 808 may form an angle of 51° with a line extending from the center of the tube 808 and through the mouth of the hole indicated at 881 in FIGURE 9, this line from the center of the tube extending at an angle of 45° to a horizontal plane normal to the plane of FIGURE 9. Specifically, the axis of the hole extending in tube 808 and receiving the right-hand part of conductor section 807d as viewed in FIGURE 9 may extend at an angle of about 6° downwardly from the horizontal as viewed in FIGURE 9. The conductor section 807d and the conductor section 807e thus join at a bend with an included angle of approximately 141°. The critical launching piece 880 and the tube 808 may be made of "Slycast-Lo K."

It will be observed that the surface wave traveling along the section 807d is traveling along a path forming an angle of approximately 6° to the horizontal, after which the section 807e extends at an angle of approximately 45° to the horizontal representing a change in direction of the surface wave of approximately 39°. It has been discovered that by relating the dielectric constants of the critical launching portions including piece 80 and the adjacent portions of tube 808 and the dielectric constant at the outer side of the bend (air) to the angle of change of direction desired, the surface wave may be caused to travel about the bend with relatively little loss of energy. The required angle for given dielectric constants at the bend region is determined by the equation, the sine of the angle of incidence of the surface wave with respect to a normal at the interface (in the present example, the angle of incidence is approximately 51°) is equal to the reciprocal of the square root of the dielectric constant of the material of the critical angle launching device.

The means for guiding the microwave energy from the coil part 807e of conductor 807 to the axially extending part of the righthand side of the sensing head 800 may correspond to the parts just described at the lefthand or launching end. Corresponding parts have been given primed reference numerals for convenience of reference. The microwave energy is coupled from the transmission line associated with conductor 842' at the receiving end to a rectangular wave guide 841' leading to a microwave energy measurement means 885.

The measurement system for determining the absorption or phase change of the microwave energy transmitted along the coil 807e may take any of the forms previously described herein. A presently preferred system is generally as indicated in FIG. 6.

To describe the electric circuit in somewhat greater detail, the modulated microwave source 840 may comprise a klystron operating at 22,150 megacycles per second. About 1% of the input microwave energy may be coupled to a line indicated at 887 which leads through a zero microwave attenuator 888 and a second microwave attenuator 890 to one input of a Brown amplifier, the input lead being designated by the reference numeral 891. The Brown amplifier may be considered part of the microwave energy measurement means component 885. An output crystal 895 and a reference crystal 896 are connected across the two inputs 891 and 897 to the Brown amplifier included in component 885. The common point between the two crystals may be grounded as indicated. The Brown amplifier senses any unbalance between the input energy from line 891 and from line 897 and drives a balance motor associated with balance microwave attenuator 892 so as to restore a balance condition. The drive for the balance attenuator 892 may also be coupled to a 1000 ohm potentiometer controlling one input to a second Brown amplifier. The second Brown amplifier maintains a balance between the setting of the setting of the 1000 ohm potentiometer and the setting of a 20,000 ohm square law potentiometer. Further, a second 1000 ohm linear potentiometer is coupled with the 20,000 ohm square law potentiometer and the variations of the second 1000 ohm linear potentiometer may be arranged to provide a direct indication of moisture content corrected for the basis weight (F) of the web 801. The voltage (V) provided by the first 1000 ohm potentiometer as one input to the second Brown amplifier is thus set equal to a constant A multiplied by the square of the angular position theta of the 20,000 ohm square law potentiometer plus a second constant B multiplied by basis weight (F) which may be introduced by a sliding contact operating on an upper one-third of a 500 ohm, three-turn potentiometer tapped at the lower side of the operative one-third of the potentiometer and the tap being connected to ground, and controlling the supply of voltage to the 20,000 ohm square law potentiometer. A voltage of 9 volts from a regulated power supply may be connected across the entire 500 ohm, three-turn potentiometer (but the middle one-third of the potentiometer may be shorted) and across the second linear potentiometer controlled by the output of the second Brown amplifier. The movable tap of the 500 ohm three-turn potentiometer may be connected through a 5,000 ohm variable resistor, through the 20,000 ohm square law potentiometer and through a second 5,000 ohm variable resistor in series to ground. As previously mentioned, the movable tap of the 20,000 ohm square law potentiometer is connected to a second input of the second Brown amplifier.

The first 1000 ohm potentiometer controlled by the balance motor has a positive terminal connected through a 10 ohm variable resistor and a normally closed relay contact to the positive terminal of the 9 volt regulated supply providing a positive voltage of 4.5 volts. The negative terminal of the first 1000 ohm potentiometer is connected directly to the negative terminal of the regulated voltage supply providing a voltage of —4.5 volts relative to ground.

Where the sensing head 800 is moved transversely of the direction of web movement to sample successive portions of the width dimension of the web 801, the sensing head 800 may be periodically moved to a position relative to web 801 as illustrated in FIG. 8 where the web 801 is still in driving contact with the sensing head 800 but the web is completely out of coupling relation to the helical surface wave transmission line provided by conductor 807. In this position of the sensing head relative to the web, a micro switch may be actuated to energize a pair of relays. One of the relays may open the previously mentioned normally closed relay contacts to disconnect the first 1000 ohm potentiometer from the positive terminal of the 9 volt regulated voltage supply associated with component 885 in FIG. 8. A contact of one of the relays may deenergize the balance motor associated with the first Brown amplifier and energize a zero motor associated with the first Brown amplifier and controlling zero microwave attenuator 888 associated with the first input line 891 to the first Brown amplifier. The first Brown amplifier will then adjust the zero microwave attenuator 888 so that the microwave energy input at lines 891 and 897 is equal with the sensing head out of sensing relation to web 801 as indicated in FIG. 8. The power supply for the various electric components is cooled by natural convection except for the klystron tube of source 840 which is cooled by forced air circulation. The air discharging from the klystron tube cooling circuit is delivered via fittings 900 and 901 to cavities 902 and 903 of the mounting arm assemblies 830 and 831. From cavities 902 and 903, the air moves via passages such as indicated at 904 and 905 to chambers 907 and 908. From chambers 907 and 908, the air is discharged to atmosphere via the annular clearance gap between parts 860 and 860' and the end plates 820 and 821. The constant circulation of air and positive pressure within chambers 907 and 908 serves to prevent the entrance of foreign matter and thus serves to protect bearings 832 and 833. By way of example, there may be two passages such as indicated at 904 and two passages such as indicated at 905, these passages extending at an angle of 45° through the parts 860 and 860' and being located one half inch on each side from a central vertical plane through the parts 860 and 860' and coinciding with the axis of the sensing head 800. Each passage may have a diameter of 3/32 inch. The passages open within the chambers 907 and 908 approximately 5/8 inch below a horizontal plane passing through the axis of sensing head 800.

As in the previous embodiments, a body of microwave absorbing material 915 may be located centrally within tube 815 to prevent the transmission of microwave energy axially within the tub 815 from the launching to the receiving ends of the sensing head.

The ribbed cylinder 810 initially may have an overall length of about 7,000 inches, an outside diameter of about 2.684 inches and an inside diameter of about 1.986 inches. The ribs 811 may have a thickness dimension at their radially outer margin of about .0625 inch. The grooves between the successive ribs may extend inwardly to a diameter of about 2 3/16 inches.

The ribbed cylinder 810 may receive an aperture at 1 inch from its left end as viewed in FIG. 8 and at 2 inches approximately from the right end to receive the critical launching devices such as 880. In a specific embodiment, the aperture in the ribbed cylinder 810 at the righthand end thereof was located 5.062 inches from the lefthand end of the cylinder. Where the conductor section 807d, FIG. 9, is to extend at an angle of 6° to the horizontal, the critical angle launching devices such as 880 have their under surfaces extending at a corresponding angle of 6°. The center line of the rib 811a near the top of the cylinder 810 as viewed in FIG. 9 may form an angle of 11 1/4° to the vertical. The critical angle launching device 880 may be disposed immediately adjacent the position of rib 811a and may be formed from a piece of "Stycast-LoK" having a diameter initially of .400 inch. The bore for the conductor portion 807d is drilled centrally of the rod and along its axis prior to the forming of the rod into the critical launching piece 880 by conforming its outer surface to the interior cylindrical surface of cylinder 810.

The critical launching piece corresponding to piece 880 but located at the receiving end of the sensing head 800 may be located so that the coil part 807e leads into a radially extending part as indicated diagrammatically at 807g in FIG. 9. The mouths of the holes in cylinder 808 such as the one indicated at 881 may be separated by an angle of 90° so that the last turn of the coil provided by conductor 807 overlaps the initial turn by approximately 90°.

The cylinder 808 may initially be formed with a groove .040 inch wide by .032 inch deep with a .020 radius at the bottom so that the conductor 807 when in cylindrical form with a diameter of .040 inch will project above the surface of the cylinder 808 a distance of about .008 inch. The outside diameter of the tube is then reduced together with the upper half of the cross section of the wire so that the groove has a depth of .020 inch and the wire 807 is of semicircular cross section at its portion 807e providing the helical surface wave transmission path. The inside diameter of the tube or cylinder 808 is then adjusted to the correct value for efficiently guiding the surface wave energy along the helical surface wave path. The exact inside diameter will be selected in accordance with the precise dielectric constant of the cylinder 808. Preferably, the ribbed cylinder 810, the cylinder 808 and the conductor 807 are of materials having substantially similar coefficients of thermal expansion. Alternatively, the conductor may be coated or deposited on the surface of the tube 808 and fixed thereto in such a way as to minimize any adverse effects of expansion and contraction of the tube 808.

Of course, in certain applications, the sensing head will not be subjected to a wide range of temperature variation, and the various components can be adjusted for proper operation at the desired temperature. Care must be taken, however, where the operating temperature is substantially above room temperature to avoid stretching of the conductor or a permanent constriction of the cylinder 808 which would result in a permanent change in operating dimensions if the sensing head were cooled to room temperature. Of course, the sensing head could be maintained continuously at its operating temperature to avoid any effects of expansion and contraction where the operating temperature range did not result in adverse effects of itself. Thus, as a general matter, the cylinder 808 and cooperating parts preferably have as low a coefficient of thermal expansion as possible consistent with the dielectric requirements of a particular application. The wire 807 is preferably of a relatively elastic material so as to avoid permanent deformation thereof as a result of expansion and contraction of the supporting cylinder 808.

As in the preceding embodiments, the sensing head 800 may be driven by its frictional contact with the web 801, preferably even when the sensing head is indexed to its zeroing position indicated in FIG. 8. On the other hand, the sensing head 800 may be motor driven as in the embodiment of FIG. 1 and such an embodiment should be considered as specifically disclosed with respect to the head of FIG. 8.

It should be understood that the various dimensions given herein are presented solely by way of example and not of limitation. The dimensions given may assist in the construction of an actual embodiment of the present invention but minor variations may be required depending on exact dielectric constants and other such factors. The wall thickness of the cylinder 808, for example, preferably lies between 0.05 inch and 0.15 inch. The exact wall thickness to be selected is a function of the diameter and of the dielectric constant of the material chosen. The ribs 811 are preferably about 1/4 inch in radial height, but may range from .15 inch to .30 inch. This dimension is not particularly critical. The inner ribbed cylinder 810 may have a wall thickness between .1 inch and .125 inch. It is preferably thin although the wall thickness is not critical except that it should be sufficient for structural strength in service. The wall of the metallic cylinder 815 is likewise not critical except for structural strength. The diameter of the internal bore of horn section 820 need not flare except that it is found more convenient to use a dielectric plug as indicated at 875 which in turn establishes and maintains concentricity for the conductor 807a where it passes through the horn section 820. A retaining washer may be provided as indicated at 922, made of aluminum, for retaining the plug 875 in position. The diameter of the cylindrical passage within horn section 820 is selected to suit the diameter of the insulating sleeve 871 on conductor 807a. The maximum diameter is a function of frequency and must be small enough to inhibit the propagation of higher modes of wave transmission.

The diameter of the dielectric tube 871 on conductor 807a has been selected as approximately 120 mils (.120 inch) for a particular application corresponding to a wall thickness of .040 inch and a wire diameter of .040 inch. This perimeter, again, is selected in accordance with the frequency of the microwave energy to be transmitted and of the dielectric constant of the tube 871. The dielectric constant may be between 2 and 2 1/2. A minimum is thought to be approximately 15 mils of wall thickness and a thickness of at least 40 mils is considered preferable for a tube of "Teflon," polyethylene or polystyrene. These materials are readily available in tube form.

The diameter of the conductor 842 is determined primarily by the required stiffness since this conductor rotates and must drive the bearing 850. Conductor 842 in a preferred embodiment has a diameter of .062 inch. Another consideration is that the wire 807 is, in this embodiment, of 18 gauge and the two wires 842 and 807a are joined by drilling conductor 842 longitudinally and inserting and soft-soldering the conductor 807a in the drilled hole. The conductor 842 is tapered smoothly and concentrically to a diameter to match the diameter of wire 807a at the joint 870 and avoid any microwave reflections. A number of other methods are conceivable but this method has been chosen because it requires very little heat which would degrade the characteristics of the insulating material used for tube 871.

The cylinder 808 may be of a material having a composition composed of polytetrafluoroethylene with ceramic filler. A suitable material is being marketed as "Fluorosint" and is manufactured by Polymer Corporation, Reading, Pennsylvania. This material is advantageous because it has a thermal coefficient of expansion approaching that of the metallic conductor 807 which may be silver wire. As previously mentioned, an elastic wire is preferable under some conditions and a nickel silver wire with elastic properties over the range of expansion to which the head is subjected will be advantageous. The composition known as "Fluorosint" has a dielectric constant of about 3.2. The ceramic content provides dimensional stability, reduced thermal expansion and greater wear resistance than the pure polytetrafluoroethylene, while retaining its good electrical properties.

The ribbed cylinder 810 is preferably made of the same material as the cylinder 808. Presently this material must be machined from solid stock but such machining is readily carried out. The absorber 915 may comprise sponge rubber loaded with graphite. Any suitable material which has a partial conductivity sufficient to prevent the transmission of wave energy along the axis of the sensing head within the tube 815 will serve.

Should it be desired to provide a backing or support for the web on the side thereof opposite that contracted by the sensing head, for example to stabilize web geometry within the field of the surface wave transmitted along the surface wave transmission line, such a support should have a dielectric constant substantially equivalent to that of air. This may be provided by foamed polystyrene which has a dielectric constant of from 1.02 to 1.05. When the sensing head is used for the measurement of moisture content or other substances in moving webs of paper or fabric it is anticipated that it will be preferable to mount the sensing head against a free unsupported span of such web as indicated in FIG. 9 of the present application. As a practical matter the web will then wrap the surface 806 of the sensing head 800 through a very small angle, say 3° to 5°. The change of area of contact of the web with the sensing head within plus or minus 5° will affect the absorption of the microwave energy by the moisture or the like but not significantly within the accuracy tolerance required (.25% for water content).

The tube 815 is a metal cylinder for example of aluminum. The mounting rings 816 and 817 may also be of aluminum. The rings are provided simply to support the cylinders 815, 810 and 808. Aluminum is approximately matched as to thermal expansion to the Fluorosint." It is generally important to match the dielectric material chosen for cylinders 810 and 808 with the metal chosen for cylinder 815 primarily in terms of their thermal coefficients of expansion.

It is contemplated that the illustrated sensing head will be particularly advantageous for materials such as all papers, paper boards, and like materials of any thicknesses. Any moist or wet web material such as paper and allied products, leather and leather substitutes, and perhaps even chewing gum, could be analyzed as to constituents by means of a sensing head such as shown in FIGS. 8 and 9. The only exception as to basic materials or additives presently known are conductive fillers or laminates such as the metal foils, or the papers of metallic fibers, and some of the grades of linoleum which use metallic decorative inclusions and pigments.

With some possible design modifications, particularly those affecting sensitivity, the moisture to be measured may be anywhere from zero percent to 80% or more of water by weight. Where other substances are being measured these figures may alter slightly but not substantially. Speed of the web being measured will have no significant effect. It is probably desirable that the speed be sufficient to permit averaging of the slight irregularities which may result from the rotation of the sensing head. Such irregularities are quite small and can be compensated for by adjustment of the time constants of the electric circuitry. The temperature range through which a particular unit may operate is probably limited to 100° C. where a separate wire is utilized as illustrated in the present embodiment. Operability through a substantial temperature range may be achieved by chemically depositing a metal conductor on the dielectric cylinder followed by electroplating or by a high temperature metallizing process on a ceramic cylinder corresponding to the cylinder 808. Several high temperature metallizing processes are known such as direct fired silver or one known as molymanganese in which a metallic conductor is "fired" by heat into the surface of the ceramic. The conductor may be further built up by electroplating or brazing or other suitable means.

With respect to the material for the conductor 807, any metallic conductor can be used but the higher conductivities are preferred bearing in mind the requirements relative to the coefficient of thermal expansion referred to above. In the illustrated embodiment silver is used for the conductor 807; copper would probably be the next practical choice. The diameter of the wire, for the illustrated embodiment, may be 18 or 20 gauge, American wire gage, corresponding to diameters of .039 inch and .032 inch, respectively. The diameter is not critical and may be changed to suit environment and probably would be changed for an embodiment in which the cylinder 808 becomes a full width roll having a width comparable to the width of the web 801.

The hole in tube 808 receiving conductor section 807d, FIGURE 9 and opening at 881 has a diameter chosen to pass conductor section 807d tightly and securely through the cylinder wall and to hold it securely. This fit serves to seal out water, dust and the like.

In the present embodiment, the sensing head 800 is intended to be driven by the web 801 so that the sensing head will travel at the surface speed of the web being sensed. Conceivably the sensing head could be driven at some other speed than that of the web, but in the present application this does not appear to be advantageous.

For measuring moisture content, the microwave source 840 may supply microwave energy of a frequency of 22.25 kilomegacycles per second plus or minus 0.25 kmc. This tolerance could be 1.0 kmc. without adverse effect. The frequencies ranging from 21.87 to 22.7 kmc. have been used. The frequency should be chosen generally in terms of the material to be measured, seeking out one or more of the resonance peaks. In this connection it should be pointed out that an entirely practical teaching for the construction of a unit as illustrated in FIGURES 8 and 9 would be as follows: construct the coil 807e and the sensing head generally as described herein; with a wide range frequency source measure and plot the transmittance (the reverse of attenuation) in decibels against the actual frequency of the source (located as indicated at 840 in FIGURE 8); from the plot locate the resonance peaks of the sensing head, usually within one kmc. range; and tune or specify a klystron suitable to the frequency so found.

Ambient humidity does not appear to have any significant effect upon the sensitivity of the system. Background humidity affects the system by several orders of magnitude less than the moisture in a material being measured. The attenuation appears to be directly proportional to both moisture quantity and to moisture concentration. This has the beneficial effect, however, of clearly distinguishing between the material being measured by the system and background moisture levels.

The total attenuation due to a moist web is the sum of attenuation due to moisture and attenuation due to dry fiber. The attenuation due to moisture equals the product of the moisture quantity and the moisture concentration times a constant which includes a factor representing the sensitivity of the head being used. The attenuation due to dry fiber equals the weight of dry substance per unit area where the dry substance includes the dry fiber plus other fillers or coatings which may be present times a proportionality constant representing the sensitivity of the sensing head to fiber.

Other atmospheric and ambient conditions are not significant except possibly as to dust, dirt, etc., which of course should be minimized by guarding, ventilating or the like.

The supporting plate or the like carrying the support arms 830 and 831 should be spaced from the surface of sensing head 800 by several wavelengths, for example at least two inches. This spacing is not critical and from four to ten wavelengths is probably sufficient. It may be advantageous to cover the supporting plate with a microwave absorber similar for instance to the material of elements 915. This would minimize out of phase reflected radiation from the bend in conductor 807 where the conductor emerges at opening 881 in tube 808.

The conductor 807 may be a continuous 18 gauge silver wire from the juncture indicated at 870 with conductor 842 to a corresponding junction with the conductor corresponding to 842 at the receiving side of the coil. The tubes 871 and 871' fit on the wire 807 snugly. The inner and outer diameters of the tubes are constant within practical limits.

The ribs 811 may have a thickness in the circumferential direction of 0.06 inch plus or minus .015 inch. The dimension is not critical and is chosen for the necessary structural strength to support the outer cylinder. For manufacturing convenience, the spaces between the ribs are of semi-cylindrical configuration.

The sensing head may be applied to the web at any convenient and accessible open reach of the web. By way of example, the sensing head may be installed on a reach of web coming from a conventional five foot cylindrical dryer. Such spans in an operating paper machine may be expected to have a certain amount of minor geometric instability and therefore the unit will be either preceded or followed by a single paper roll to shorten and steady the web reach being sensed. The rolls such as indicated at 803 will generally be any web take-up means and may, for example, be the calender stack where the web comes from a conventional five foot cylindrical dryer. Alternatively, the means 803 may be another dryer, a coater, a reel, or simply a pair of rolls such as indicated diagrammatically in FIGURE 9.

The surface 806 of the sensing head should be free from roughness or open places which might fill with debris which, in turn, would attenuate the microwave energy. A preferred construction is to reduce the cross section of the wire 807 forming the helix to a semi-cylindrical cross section flush with the cylindrical surface of tube 808 to provide a smooth cylindrical surface effectively free from crevices.

The contacting surfaces of the web and sensing head are subject to friction and wear only during initial contact with a web while there is a speed difference between the two surfaces. In normal operation the contact pressure between the web and surface 806 will be very slight. The value of such contact pressure will depend upon the web tension and the angle of wrap. The angle of wrap may be very small and will be less with high tension than with low tension in the particular web reach in contact with the sensing head. The purpose of the rotating head is to avoid the friction and wear which would be encountered in the use of a stationary sensing head.

Experimental work indicates that there is no significant change in the extent of the effective field beyond the surface 806 between models having as many as twelve turns per inch and as few as one turn per inch. The pitch between successive turns may be ¼ inch or approximately ½ wavelength. The minimum pitch would, of course, depend upon wire size for conductor 807.

The sensing head assembly of the embodiment of FIGURES 8 and 9 is intended to traverse across a moving web from one margin to the other, a distance equal to the full width of the web, the traversing path being arranged so that the blank portion of surface 806 as seen at the right-hand side in FIGURE 8 is never out of contact with the moving web, the extreme relative position being indicated in FIGURE 8. In other words, when the sensing head reaches the position illustrated in FIGURE 8, it reverses its direction of movement and begins to move to the right as seen in FIGURE 8 so as to again place the coil portion of the sensing head in contact with the web 801. The sensing head need not move to the extreme position shown in FIGURE 8 in each traverse of the web, but periodically during operation the head may traverse an additional increment of length to the position shown in FIGURE 8 relative to web 801 and this additional increment of movement of the head may operate a switching device so that the instrument is re-zeroed as previously described to eliminate errors which may arise due to frequency drift or other errors. This periodic standardizing may take place at every pass or, by means of a timing device or a counting device, may take place at regular time intervals or at a specific number of traverses.

For various applications in the field it will be necessary to select the degree of sensitivity with which the sensing head will operate. This sensitivity is found to be roughly proportional to the number of turns and to the axial length of the coil (i.e., the area of contact of the coil with the web material being sensed). Therefore, generally heads designed for measuring heavier weight webs and higher moisture contents will have more widely spaced turns and/or a shorter length of coil. An extreme example of this would be the use of the full width paper roll with segmented coil as the sensing head in wet end applications on a paper machine or in similar arrangements in which the turn spacing might be two inches or more and only a few turns used per sensing segment. The maximum sensitivity is obtained when the turns of the coil lie as closely spaced as the wire diameter and necessary insulation between the turns permit.

It will be apparent that the sensing head of FIGURES 8 and 9 may be modified so as to change the sensitivity level by changes in pitch of the coil turns, changes in the length of the coil, and by changes in the diameter and/or length of the mounting tub 808. Changes in the specific mounting and traversing arrangements may be necessary for other than web materials. For example, the assembly 800 could be modified with fair convenience to be supported from one end in a cantilever fashion to provide access for cable or strand material or even to provide for self-cleaning when the sensing head is intruded into a stream of pulverant or particulate material such as grain or food materials particularly if there was a tendency for adherence to the surface of the sensing head. Such an arrangement could provide readily for doctoring or brushing in order to keep the surface of the sensing head free of adherent material.

Another class of modification would include changes in the material and/or dimensions of the parts of the assembly.

It is considered that the sensing heads in accordance with the present invention could be utilized with respect to millimeter waves and possibly with respect to long infra-red waves. The limiting factor will be the diameters required for the dielectric components becoming too small.

The sensing head of FIGURES 8 and 9 could be mounted in sensing relation to the path of a liquid, gas, granular material, slurry, etc. For example, the sensing head might be utilized in the measurement of moisture content in wood chips. This will require a protected mounting arrangement to couple the coil so that the wave field of the coil intercepts the path of the material, either the full stream or a sampled and by-passed stream.

It will be understood by those skilled in the art that source 840 may comprise a signal at the desired microwave frequency which is not modulated. The microwave energy measuring means 885 may then respond to the amplitude of the microwave signal transmitted rather than to the modulation amplitude of the transmitted signal, for example.

The zeroing system may be actuated by means of a manually operated pushbutton or it may be actuated automatically in response to the sensing head moving to the position shown in FIGURE 8 relative to web 801.

The balance motor and balance microwave attenuator 892 should be set in a predetermined position during the zeroing operation. For example, the balance motor may be turned manually to a predetermined angular position to produce a predetermined setting of the balance microwave attenuator. Alternatively, this may be accomplished automatically by supplying a sluing signal to the Brown amplifier associated with the balance motor to drive the balance motor until a pin slips into a hole in a cam on the balancing motor shaft to lock the balancing motor at one particular location which is the zeroing location. The pin may be retracted from its cooperating hole during normal operation by means of a solenoid which retracts the pin against the operation of a compression spring. The solenoid is then deenergized at the beginning of a zeroing operation to allow the compression spring to urge the pin against the surface of the cam and into the hole in the cam when the hole is aligned with the pin.

As a further embodiment of the present invention it is conceived that the coils herein disclosed may consist of a series of elongated turns such as indicated in FIGURE 11 of my copending application Ser. No. 753,987. Such elongated turns preferably have a straight length of conductor with a straight portion in sliding contact with the web and extending either transversely or longitudinally of the web. Where the coil consists of a series of such elongated turns, the series of straight conductor portions extending parallel and in contact with the web may be closely spaced, for example with a separation between successive straight conductor portions of one wavelength or less, or the straight lengths of the successive turns may be more widely spaced in which case there is relatively little coupling between the successive turns and the length of the turns relative to the frequency is not important. Where the successive elongated turns have straight conductor portions in contact with the web which are closely spaced, for example with a spacing of less than one wavelength, the length of the successive turns should be such that corresponding points on adjacent lengths of the conductor have substantially the same phase. Where the elongated turns have the configuration illustrated in FIGURE 11 of Ser. 753,987, each turn may comprise a straight length of wire extending at right angles to the direction of movement of the web, for example, connecting with a semi-circular portion located in a plane at right angles to the plane of the web, connecting with a second length of wire extending straight and parallel to the plane of the web but spaced a number of wavelengths from the first conductor portion and spaced out of coupling relation to the web. The second straight length portion would then connect with a second semi-circular length portion disposed in the plane of the web and connecting with a third length portion of the conductor extending parallel to the first conductor length but spaced therefrom in the direction of movement of the web, and so forth to define a flattened helical configuration. Where the first and third lengths of conductor are closely spaced in relation to one wavelength of the microwave energy, the length of the turns of the helix are such that points on the first and third length portions which are opposite each other with respect to the direction of movement of the web will have substantially the same phase. Of course, as previously discussed, once a particular flattened helical coil has been constructed, it is advisable to empirically determine its response. The actual microwave source to be utilized with the flattened helical coil would then have a frequency corresponding to a resonance peak in the plot of transmittance as a function of frequency, or if frequency modulation is used its frequency would be arranged to scan through this peak. One way in which frequency modulation might be of value would be where the resonance peak in the plot of transmittance shifts due to temperature change or other causes. The frequency range scanned could be arranged always to include the peak. In such a system a change in the mean amplitude of the received signal would give a measure of the attenuation due to the substance being sensed, but the mean amplitude of the received signal would not change with temperature or other cause of the shifting of the resonance peak of the sensing head.

The various modifications and the selection of parameters described with respect to the embodiment of FIGURES 8 and 9 are of course applicable to the other embodiments of the present application. Further, all of the information given with respect to the preceding embodiments is hereby specifically applied also to the embodiment of FIGURES 8 and 9, and the information set forth with respect to the embodiments of FIGURES 8 and 9 is hereby specifically applied also to the preceding embodiments.

It will be apparent that many modifications and variations may be effected without parting from the scope of the novel concepts of the present invention.

I claim as my invention:

1. In combination,
   (a) a core of dielectric material having an external cylindrical surface with a helical groove therein,
   (b) a surface wave transmission line extending in said helical groove of said core of dielectric material and providing a helical surface wave path having a series of turns,
   (c) means coupled to said surface wave transmission line for transmitting microwave energy along said surface transmission line as a surface wave with the surface wave travelling successively about said series of turns of said helical surface wave path,
   (d) means for exposing a test material to the field of the surface wave transmitted along said helical surface wave path at a plurality of said turns thereof, and
   (e) means for sensing the effect of said test material on the transmission of microwave energy along said helical surface wave path as a measure of a property of said test material.

2. In combination,
   (a) a surface wave transmission line in the form of a coil having a series of turns,
   (b) means coupled to said surface wave transmission line for transmitting microwave energy along said surface wave transmission line as a surface wave with the surface wave travelling successively about the turns of said coil,
   (c) support means having a metallic surface for supporting a test dielectric material within the field of said surface wave at a plurality of said turns of said coil, said metallic surface being spaced from the turns of said coil a distance less than about 10 times the wavelength of said microwave energy, and
   (d) means for sensing the effect of said test material on the transmission of said microwave energy along said surface wave transmission as a measure of a property of said test dielectric material.

3. Apparatus for sensing a constituent of web material comprising (a) a surface wave transmission line in the form of a coil having a series of turns, (b) means coupled to said surface wave transmission line for transmitting microwave energy of approximately a resonance absorption frequency for said constituent along said surface wave transmission line as a surface wave with the surface travelling successively about the turns thereof, (c) support means having a web supporting surface for supporting a moving web of dielectric material within the field of the surface wave at a plurality of turns of said coil, said web supporting surface being spaced from said coil a distance between one-half the wavelength and two times the wavelength of the microwave energy, and (d) means for sensing the effect of said web of dielectric material on the transmission of microwave energy along said surface wave transmission line as a measure of the amount of said constituent in said web.

4. Apparatus for sensing moisture content of a moving paper web comprising
(a) a core of dielectric material,
(b) a surface wave transmission line in the form of a helix encircling said core and supported thereby and providing a helical surface wave path having a series of turns,
(c) means coupled to said surface wave transmission line for transmitting microwave energy of approximately a resonance absorption frequency for water along said surface wave transmission line as a surface wave with the surface wave travelling successively about said series of turns of said helical surface wave path,
(d) means for supporting a moving paper web in spaced relation to said surface wave transmission line but within the field of said surface wave transmitted therealong, and
(e) means for sensing the effect of said paper web on the transmission of microwave energy along said helical surface wave path as a measure of the moisture content of said paper web.

5. In combination,
(a) a helical surface wave transmission line having successive turns for receiving microwave energy of a predetermined frequency,
(b) means for coupling microwave energy of said predetermined frequency to said transmission line for transmission along the successive turns thereof,
(c) a layer of dielectric material embedding the successive turns of the surface transmission line and providing a smooth cylindrical exterior surface for engaging a test material moving through the field of the surface wave at the successive turns of the surface wave transmission line,
(d) means for moving the test material through the field of the surface transmission line in coupling relation to the successive turns thereof, and
(e) means coupled to said surface wave transmission line for obtaining an electrical indication of the interaction between said test material and said surface wave.

6. Apparatus for sensing a constituent of web material comprising
(a) a helical surface wave transmission line having successive turns for receiving microwave energy of a predetermined frequency,
(b) means for coupling microwave energy of said predetermined frequency to said transmission line for transmission along the successive turns thereof,
(c) a layer of dielectric material embedding the successive turns of the surface transmission line and providing a smooth cylindrical exterior surface for engaging a test material moving through the field of the surface wave at the successive turns of the surface wave transmission line, (d) means for moving a web of dielectric material across and in contact with cylindrical exterior surface of said layer of dielectric material in coupling relation to the field of the surface wave at successive turns of said helical surface wave transmission line,
(e) means mounting said surface wave transmission line for rotation on a central axis, and
(f) means coupled to said surface wave transmission line for providing an electrical indication of the interaction between said web of dielectric material and said surface wave.

7. A sensing head for sensing a constituent of material comprising
(a) a rotatable head assembly rotatable on an axis and having a plurality of lengths of an open waveguide defining portions of a substantially cylindrical surface having its central axis substantially coincident with the axis of rotation of said rotatable head assembly and providing respective electromagnetic energy paths external to said cylindrical surface,
(b) means mounting said head for rotation on its axis,
(c) means for moving said material past said head assembly in contacting relation to said lengths of said open waveguide,
(d) means for coupling electromagnetic energy of a frequency sensitive to said constituent of said material to said lengths of said waveguide for transmission therealong in coupling relation to said material moving past said head assembly, and
(e) means coupled to said waveguide for sensing the interaction of said electromagnetic energy and said constituent of said material as an indication of the presence of said constituent.

8. A sensing system comprising
(a) a sensing head for coupling microwave energy to a material for sensing a constituent of said material,
(b) means for supplying energy of a sensitive frequency to said head,
(c) energy difference sensing means having two inputs and operative for sensing a difference in amplitude between the input energy levels at said inputs and having an input for delivering an error signal in accordance with any difference between said input energy levels,
(d) means coupled to said energy supplying means for coupling a fraction of the output energy thereof to one input of said energy difference sensing means,
(e) means coupled to said sensing head for receiving output energy therefrom varying in accordance with the amount of said constituent coupled to said head,
(f) a variable attenuator having its input connected to said energy receiving means for receiving said output energy therefrom and having its output connected to the second input of said energy difference sensing means,
(g) control means coupled to said variable attenuator and controlled by the error signal from said energy difference sensing means to adjust said variable attenuator to maintain a substantially zero error from said difference sensing means, and
(h) constituent indicating means coupled to said control means for indicating the adjustment of said attenuator required to balance the input energy levels at the two inputs of said energy difference sensing means.

9. A sensing head comprising
(a) a tube having a thickness in the radial direction less than about .15 inch and having a helical conductor on the external surface thereof, said helical conductor having an exterior surface substantially flush with said tube external surface, (b) means for guiding a web across said tube with a surface of said web engaging said exterior surface of said helical conductor,
(c) means mounting said tube for rotation with a surface speed substantially equal to the surface speed of said web,
(d) stationary means for coupling electromagnetic energy having a wavelength less than about one-half meter to said helical conductor for transmission therealong in coupling relation to said web at the successive turns thereof, and
(e) means coupled to said helical conductor for sensing the interaction between said electromagnetic energy and said constituent of said web as a measure of the amount of said constituent in successive increments of said web.

References Cited by the Examiner

UNITED STATES PATENTS

| | | | |
|---|---|---|---|
| 2,505,778 | 5/1950 | Limbach | 324—34 |
| 2,629,004 | 2/1953 | Greenough | 34—34 |
| 2,659,860 | 11/1953 | Brezeale | 324—58.5 |
| 2,723,378 | 11/1955 | Clavier | 333—95 X |

FOREIGN PATENTS 746,316  3/1956  Great Britain.

OTHER REFERENCES

Radio-Electronics, "String Transmission and Helical Wave Coils," article by Freedman, June 1951, pp. 24 and 25.

WALTER L. CARLSON, *Primary Examiner.*

ADDISON E. RICHMOND, *Assistant Examiner.*